United States Patent
Ganin et al.

(10) Patent No.: US 9,971,762 B2
(45) Date of Patent: May 15, 2018

(54) SYSTEM AND METHOD FOR DETECTING MEANINGLESS LEXICAL UNITS IN A TEXT OF A MESSAGE

(71) Applicant: YANDEX EUROPE AG, Lucerne (CH)

(72) Inventors: Egor Vladimirovitch Ganin, Moscow Region (RU); Anton Igorevich Kholodkov, Moscow Region (RU)

(73) Assignee: YANDEX EUROPE AG, Lucerne (CH)

( * ) Notice: Subject to any disclaimer, the term of this patent is extended or adjusted under 35 U.S.C. 154(b) by 0 days. days.

(21) Appl. No.: 15/525,800

(22) PCT Filed: Jun. 12, 2015

(86) PCT No.: PCT/IB2015/054485
§ 371 (c)(1),
(2) Date: May 10, 2017

(87) PCT Pub. No.: WO2016/083907
PCT Pub. Date: Jun. 2, 2016

(65) Prior Publication Data
US 2017/0329763 A1 Nov. 16, 2017

(30) Foreign Application Priority Data
Nov. 28, 2014 (RU) ................. 2014147903

(51) Int. Cl.
G06F 17/28 (2006.01)
G06F 17/27 (2006.01)
G06F 17/30 (2006.01)

(52) U.S. Cl.
CPC .......... *G06F 17/277* (2013.01); *G06F 17/271* (2013.01); *G06F 17/30705* (2013.01)

(58) Field of Classification Search
USPC ............ 704/1-10, 250, 251, 255, 257, 270, 704/270.1, 277; 715/256; 1/1
See application file for complete search history.

(56) References Cited

U.S. PATENT DOCUMENTS 6,137,911 A 10/2000 Zhilyaev
7,222,299 B1 5/2007 Lim et al.
(Continued)

FOREIGN PATENT DOCUMENTS

RU 2378692 C2 1/2010
WO 2001029709 A1 4/2001
WO 2014064527 A1 5/2014

OTHER PUBLICATIONS

International Search Report with regard to PCT/IB2015/054485 dated Oct. 5, 2015.
(Continued)

*Primary Examiner* — Huyen Vo
(74) *Attorney, Agent, or Firm* — BCF LLP

(57) ABSTRACT

There is provided a system and a method for detecting meaningless lexical units in a text message, the method comprising: performing a syntax analysis of the text message and determining at least one lexical unit as a first potential meaningless lexical unit; determining a control sum of the first potential meaningless lexical unit; matching using a first parameter, the first potential meaningless lexical unit with lexical units from a plurality of lexical units from a lexical units database, wherein matching using the first parameter comprises matching a control sum of the first potential meaningless lexical unit with control sums of meaningless lexical units from the lexical units database; determining the first potential meaningless lexical unit is a meaningless lexical unit if the lexical units database includes at least one meaningless lexical unit with a control sum
(Continued)

corresponding to the control sum of the first potential meaningless lexical unit.

20 Claims, 7 Drawing Sheets

(56) References Cited

U.S. PATENT DOCUMENTS

| | | | |
|---|---|---|---|
| 7,836,061 | B1 | 11/2010 | Zorky |
| 8,001,195 | B1 | 8/2011 | Kalinin |
| 8,051,138 | B2 | 11/2011 | Madnani |
| 2002/0103836 | A1* | 8/2002 | Fein .................. G06F 17/241 |
| 2004/0158452 | A1 | 8/2004 | Polanyi et al. |
| 2006/0092920 | A1 | 5/2006 | Karamchedu et al. |
| 2006/0206569 | A1 | 9/2006 | Heidloff et al. |
| 2007/0244692 | A1 | 10/2007 | Balchandran et al. |
| 2008/0282153 | A1* | 11/2008 | Kindeberg ............ G06F 17/274 |
| | | | 715/256 |
| 2009/0197225 | A1 | 8/2009 | Sheehan et al. |
| 2011/0035211 | A1 | 2/2011 | Eden |
| 2011/0258181 | A1 | 10/2011 | Brdiczka et al. |
| 2013/0179800 | A1 | 7/2013 | Jeong et al. |
| 2013/0268839 | A1 | 10/2013 | Lefebvre et al. |
| 2014/0250219 | A1 | 9/2014 | Hwang |
| 2014/0324416 | A1 | 10/2014 | Lapshin et al. |

OTHER PUBLICATIONS

International Preliminary Report on Patentibility with regard to PCT/IB2015/054485 dated Mar. 18, 2016.

* cited by examiner

SYSTEM AND METHOD FOR DETECTING MEANINGLESS LEXICAL UNITS IN A TEXT OF A MESSAGE

CROSS-REFERENCE

The present application claims priority to Russian Patent Application No. 2014147903, filed Nov. 28, 2014, entitled "СИСТЕМА И СПОСОБ ВЫЯВЛЕНИЯ НЕ ЗНАЧАЩИХ ЛЕКСИЧЕСКИХ ЕДИНИЦ В ТЕКСТЕ СООБЩЕНИЯ ЭЛЕКТРОННОЙ ПОЧТЫ" the entirety of which is incorporated herein.

FIELD OF THE TECHNOLOGY

The present technology relates to a system and method for detecting meaningless lexical units in a text of a message.

BACKGROUND

In the present computer technology the use of e-mail is very common. An e-mail service user often receives more than ten e-mail messages per day. Some users receive more than a hundred of e-mail messages per day.

Generally when composing an e-mail message a sender fills in a subject field where s(he) can provide a brief summary of a topic of the e-mail message. The "subject" field allows the user to familiarize her (him)self with a pack of received e-mail messages and immediately upon receiving an e-mail message define its priority. For example the user can immediately realize that the message with the "subject" field "Biggest-ever discount on suitcases!" is of minor importance without reading its content. and, on the contrary, determine that the message with the "subject" field "Important notice: Your flight details have changed" as important.

In some cases however the "subject" field can be insufficient for determining priority of the e-mail message. It happens when an author suggested an indistinct topic or when the user receives a lot of e-mail messages with similar topics. In such cases a function of a preview the first lines of an e-mail message can be useful. For example, Microsoft Outlook™ e-mail client allows to review the first three lines of a message in the main window.

In some cases reviewing some of the first lines does not allow to determine priority of the e-mail message either. For example, it happens when the first lines comprise a title and general introduction phrases. Such insignificant words and phrases can hide the main point of the message.

Thus, although the conventional computer systems are decent, the improvement of these systems is still possible.

SUMMARY

It is an object of the present technology to ameliorate at least some of the inconveniences present in the prior art.

According to the embodiments of the present technology there is provided a method for computer processing of a text message sent to an user which message comprises both meaningful lexical units and meaningless lexical units; the method comprises: (i) performing a syntax analysis of a text message for determining at least one lexical unit as a potential meaningless lexical unit; (ii) performing a first check of at least one potential meaningless lexical unit by means of comparison with meaningless lexical units from a first lexical unit database, the first database was generated in result of the syntax analysis of previous text messages sent to the user; (iii) performing a second check of the at least one potential meaningless lexical unit by means of comparison with meaningless lexical units from a second meaningless lexical unit database, the second database was generated in result of the syntax analysis of previous text messages sent to a group of users from the plurality of users; (iv) in response to the positive result of any of: the first and the second check determining the potential meaningless lexical unit as a meaningless lexical unit.

In some implementations, the method further comprises generating the text message abstract; the abstract being generated in such a way that there are no meaningless lexical units in the text message abstract.

In some implementations, the text message abstract comprises at least one meaningful phrase.

In some implementations, the text message abstract is an abstract of the most significant part of a text message.

In some implementations, the text message is an e-mail message in which the most significant part of the given e-mail message is defined as the most significant logical block of HTML, code from the plurality of the logical blocks of HTML, code which comprise text.

In some implementations, the most significant logical block of the HTML code comprises a block of the HTML code which comprises text, and the size of which is larger than a size of any other logical block of the HTML code of the e-mail message.

In some implementations, the most significant logical block of the HTML code is a block of the HTML code which comprises text, and the text of the most significant logical block of the HTML code comprises the majority of meaningful lexical units in comparison with the text of any other logical block of the HTML code of the given e-mail message.

In some implementations, the text message abstract is an abstract of the predefined number of paragraphs from the beginning of a text message.

In some implementations, the group of users is an entire plurality of users.

In some implementations, the method further comprises receiving an incoming text message.

In some implementations, the lexical unit is any of: (i) a word, (ii) a phrase, (iii) a sentence, (iv) a paragraph.

In some implementations, determining at least one lexical unit as a potential meaningless lexical unit comprises determining at least one meaningful lexical unit.

In some implementations, determining at least one lexical unit as a potential meaningless lexical unit is performed on the basis of the syntax analysis of one of: (i) an entire text of the text message, and (ii) a part of the text from the text message; the part of the text from the text message comprises predefined number of paragraphs.

In some implementations, performing a syntax analysis of a text message comprises the markup language analysis of the text message.

In some implementations, analyzing the markup language of the text message comprises analyzing at least one of: a structure of a text message, a font type, a font size, a font face, punctuation marks, and special marks.

In some implementations, the method further comprises determining a lexical unit control sum.

In some implementations, the lexical unit control sum is any of: a control element and a combination of control elements, the control element is any element selected from: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

In some implementations, the comparison of the potential meaningless lexical unit with meaningless lexical units of any of: the first lexical units database and the second lexical units database, is carried out, using at least one of predefined parameters, by matching the potential meaningless lexical unit with meaningless lexical units of any of: the first lexical units database and the second lexical units database.

In some implementations, matching is carried out using a predefined parameter which can be one of: a control sum and a combination of particular control elements, being a part of the lexical unit control sum.

In some implementations, a result of any of: the first check and the second check is positive when the comparison using at least one of the predefined parameters defines one of: partial matching using said at least one of predefined parameters, the level of match is higher than a predefined match threshold and full matching using the at least one of predefined parameters.

In some implementations, the method further comprises, before the syntax analysis of a text message, generating at least one of: the first database and the second database.

Another object of the present technology is a computer. The computer includes a processor. The processor is configured to render the computer operable to execute: (i) performing a syntax analysis of a text message for determining at least one lexical unit as a potential meaningless lexical unit; (ii) performing a first check of at least one potential meaningless lexical unit by means of comparison with meaningless lexical units from a first lexical unit database, the first database was generated in result of the syntax analysis of previous text messages sent to the user; (iii) performing a second check of the at least one potential meaningless lexical unit by means of comparison with meaningless lexical units from a second meaningless lexical unit database, the second database was generated in result of the syntax analysis of previous text messages sent to a group of users from the plurality of users; (iv) in response to the positive result of any of: the first and the second check determining the potential meaningless lexical unit as a meaningless lexical unit.

In some implementations, the processor is configured to render the computer operable to execute generating the text message abstract; the abstract being generated in such a way that there are no meaningless lexical units in the text message abstract.

In some implementations of the computer, the text message abstract comprises at least one meaningful phrase.

In some implementations of the computer, the text message abstract is an abstract of the most significant part of a text message.

In some implementations of the computer, the text message is an e-mail message in which the most significant part of the given e-mail message is defined as the most significant logical block of HTML, code from the plurality of the logical blocks of HTML, code which comprise text.

In some implementations of the computer, the most significant logical block of the HTML, code comprises a block of the HTML, code which comprises text, and the size of which is larger than a size of any other logical block of the HTML code of the e-mail message.

In some implementations of the computer, the most significant logical block of HTML code is a block of HTML code comprising text; the text of the most significant logical block of HTML code which comprises the majority of meaningful lexical units in comparison with the text of any other logical block of HTML code of the given e-mail message.

In some implementations of the computer, the text message abstract is an abstract of the predefined number of paragraphs from the beginning of the text message.

In some implementations of the computer, the group of users is an entire plurality of users.

In some implementations of the computer, the processor is configured to render the computer operable to execute receiving the text message.

In some implementations of the computer, the lexical unit is any of: (i) a word, (ii) a phrase, (iii) a sentence, (iv) a paragraph.

In some implementations of the computer, determining at least one lexical unit as a potential meaningless lexical unit comprises determining at least one meaningful lexical unit.

In some implementations of the computer, determining at least one lexical unit as a potential meaningless lexical unit is performed on the basis of the syntax analysis of one of: (i) an entire text of the text message and (ii) a part of the text of the text message.

In some implementations of the computer, carrying out the syntax analysis of an e-mail message includes the markup language analysis of the e-mail message.

In some implementations of the computer, analyzing the markup language of the text message comprises analyzing at least one of: a structure of a text message, a font type, a font size, a font face, punctuation marks, and special marks.

In some implementations of the computer, the processor is configured to render the computer operable to execute determining the lexical unit control sum.

In some implementations of the computer, the lexical unit control sum is any of: a control element and a combination of control elements, the control element is any element selected from: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

In some implementations of the computer, the comparison of the potential meaningless lexical unit with meaningless lexical units of any of: the first lexical units database and the second lexical units database, is carried out, using at least one of predefined parameters, by matching the potential meaningless lexical unit with meaningless lexical units of any of: the first lexical units database and the second lexical units database.

In some implementations of the computer, the matching is carried out using a predefined parameter which can be one of: a control sum and a combination of particular control elements, being a part of the lexical unit control sum.

In some implementations of the computer, a result of any of: the first check and the second check is positive when the comparison using at least one of the predefined parameters defines one of: partial matching using said at least one of predefined parameters, the level of match is higher than a predefined match threshold and full matching using the at least one of predefined parameters.

In some implementations of the computer, the processor is further configured to render the computer operable to generate, before carrying out the syntax analysis of the text message, at least one of: the first database and the second database.

Another object of the present technology is a method of determining meaningless lexical units in a text message, the method is executable on a computer. The method includes: (i) carrying out the syntax analysis of a text message for determining at least one lexical unit as a first potential meaningless lexical unit; (ii) determining a control sum of the first potential meaningless lexical unit; (iii) matching (using a first parameter) the first potential meaningless lexical unit with meaningless lexical units of a plurality of meaningless lexical units from a lexical units database; matching (using a first parameter) is matching the control sum of the first potential meaningless lexical unit with control sums of the meaningless lexical units from the lexical units database; (iv) determining the first potential meaningless lexical unit as a meaningless lexical unit if the lexical units database includes at least one meaningless lexical unit with a control sum corresponding to the control sum of the first potential meaningless lexical unit.

In some implementations if there is no meaningless lexical unit with a control sum corresponding to the control sum of the first potential meaningless lexical unit in the lexical unit database, the method further includes: (i) subdividing the first potential meaningless lexical unit to obtain at least two smaller lexical unit and determining at lest one smaller lexical unit as a second potential meaningless lexical unit (ii) determining a control sum of the second potential meaningless lexical unit; (iii) matching using a second parameter the first potential meaningless lexical unit with lexical units from the lexical units database, wherein matching using the second parameter comprises matching the control sum of the second potential meaningless lexical unit with control sums of meaningless lexical units from the lexical units database; (iv) determining the second potential meaningless lexical unit is a meaningless lexical unit if the lexical units database includes at least one meaningless lexical unit with a control sum corresponding to the control sum of the second potential meaningless lexical unit.

In some implementations the first potential meaningless lexical unit is a paragraph and the second potential meaningless lexical unit is a sentence from the paragraph.

In some implementations a control sum includes all the control elements.

In some implementations a control element is any of: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

In some implementations the matching using the first parameter is carried out using a first set of control elements and matching using the second parameter is carried out using a second set of control elements.

In some implementations the first set of control elements and the second set of control elements are the same.

In some implementations control sums are considered matching if the control sums are the same.

In some implementations if a difference between the control sums is detected, the method further comprises: checking a measure of the difference between the control sums and determining the control sums as matching if the measure of the difference is within a predefined permissible amplitude of the difference.

In some implementations the measure of the difference is determined for each control element from a control sum and the amplitude of the difference is defined for each control element from a control sum.

In some implementations wherein a lexical database includes at least one meaningless lexical unit with a control sum corresponding to the control sum of the potential meaningless lexical unit, the method further comprises performing a character-by-character match of the potential meaningless lexical unit with the at least one meaningless lexical unit and wherein in response to a match of a character sequence of the potential meaningless lexical unit with a character sequence of the at least one meaningless lexical unit, the method further comprises determining the potential meaningless lexical unit as a meaningless lexical unit.

In some implementations a lexical unit from a plurality of lexical units from the lexical unit database is meaningless if its weight exceeds the predefined threshold value.

In some implementations a lexical unit database is generated on the basis of a plurality of lexical units which can be found in a plurality of text message and a weight of each lexical unit is in direct proportion with a given lexical unit frequency in the plurality of lexical units which can be found in the plurality of text message.

In some implementations, performing the syntax analysis of the text message comprises analyzing the markup language of the text message.

In some implementations, analyzing the markup language of the text message comprises analyzing at least one of: a structure of a text message, a font type, a font size, a font face, punctuation marks, and special marks.

In some implementations, carrying out the syntax analysis of the text message comprises executing a syntax analysis of a predefined number of paragraphs from the beginning of the text message.

In some implementations, the text message is an e-mail message.

In some implementations, the text message is an e-mail message and carrying out a syntax analysis of a text message is a syntax analysis of the most significant part of a text message.

In some implementations, the most significant part of the e-mail message is determined based on an analysis of a most significant logical block of HTML, code from a plurality of the logical blocks of an HTML code of the e-mail message.

In some implementations, the most significant logical block of the HTML code comprises a block of the HTML code which comprises text, and the size of which is larger than a size of any other logical block of the HTML code of the e-mail message.

In some implementations, the most significant logical block of the HTML code is a block of the HTML code which comprises text, and the text of the most significant logical block of the HTML code comprises the majority of meaningful lexical units in comparison with the text of any other logical block of the HTML code of the given e-mail message.

In some implementations, the lexical unit is any of: (i) a word, (ii) a phrase, (iii) a sentence, (iv) a paragraph.

In some implementations, determining at least one lexical unit as a potential meaningless lexical unit comprises determining at least one meaningful lexical unit.

In some implementations, determining at least one lexical unit as a potential meaningless lexical unit is performed on the basis of the syntax analysis of one of: (i) an entire text of the text message and (ii) a part of the text of the text message.

In some implementations, the method further comprises receiving the text message.

In some implementations, an unique control sum is an ID of an unique lexical unit.

Another object of the present technology is a computer. The computer includes a processor. The processor is configured to render the computer operable to execute: (i) carrying out a syntax analysis of a text message (ii) determining at least one lexical unit as a first potential meaningless lexical unit; (iii) determining a control sum of the first potential meaningless lexical unit; (iv) matching (using a first parameter) the first potential meaningless lexical unit with meaningless lexical units of a plurality of meaningless lexical units from a lexical units database; matching (using a first parameter) is matching the control sum of the first potential meaningless lexical unit with control sums of the meaningless lexical units from the lexical units database; (v) determining the first potential meaningless lexical unit as a meaningless lexical unit if the lexical units database includes at least one meaningless lexical unit with a control sum corresponding to the control sum of the first potential meaningless lexical unit.

In some implementations if there is no meaningless lexical unit with a control sum corresponding to the control sum of the first potential meaningless lexical unit in the lexical unit database, the computer further executes: (i) subdividing the first potential meaningless lexical unit to obtain at least two smaller lexical unit and determining at lest one smaller lexical unit as a second potential meaningless lexical unit (ii) determining a control sum of the second potential meaningless lexical unit; (iii) matching using a second parameter the first potential meaningless lexical unit with lexical units from the lexical units database, wherein matching using the second parameter comprises matching the control sum of the second potential meaningless lexical unit with control sums of meaningless lexical units from the lexical units database; (iv) determining the second potential meaningless lexical unit is a meaningless lexical unit if the lexical units database includes at least one meaningless lexical unit with a control sum corresponding to the control sum of the second potential meaningless lexical unit.

In some implementations the first potential meaningless lexical unit is a paragraph and the second potential meaningless lexical unit is a sentence from the paragraph.

In some implementations the control sum includes plurality of control elements.

In some implementations the control element is any of: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

In some implementations the matching using the first parameter is carried out using a first set of control elements and matching using the second parameter is carried out using a second set of control elements.

In some implementations the first set of control elements and the second set of control elements are the same.

In some implementations control sums are considered matching if the control sums are the same.

In some implementations if the matching detects a difference between the control sums the processor further executes: checking a measure of the difference between the control sums and determining the control sums as matching if the measure of the difference is within a predefined permissible amplitude of the difference.

In some implementations the measure of the difference is determined for each control element from a control sum and the amplitude of the difference is defined for each control element from a control sum.

In some implementations wherein the lexical unit database includes at least one meaningless lexical unit with a control sum corresponding to a control sum of a potential meaningless lexical unit, the processor is configured to render the computer operable to execute carrying out a character-by-character match of the potential meaningless lexical unit with this at least one meaningless lexical unit and, in response to a match of a character sequence of the potential meaningless lexical unit with a character sequence of the at least one meaningless lexical unit, determining the potential meaningless lexical unit as a meaningless lexical unit.

In some implementations a lexical unit from the plurality of lexical units from the lexical unit database is meaningless if its weight exceeds the predefined threshold value.

In some implementations the lexical unit database is generated on the basis of the plurality of lexical units which can be found in the plurality of text messages and in which a weight of each lexical unit is in direct proportion with the given lexical unit frequency in the plurality of lexical units which can be found in the plurality of the text messages.

In some implementations, performing the syntax analysis of the text message comprises analyzing the markup language of the text message.

In some implementations, analyzing the markup language of the text message comprises analyzing at least one of: a structure of a text message, a font type, a font size, a font face, punctuation marks, and special marks.

In some implementations, carrying out the syntax analysis of the text message comprises executing a syntax analysis of a predefined number of paragraphs from the beginning of the text message.

In some implementations, the text message is an e-mail message.

In some implementations, the text message is an e-mail message and carrying out the syntax analysis of the text message comprises executing a syntax analysis of a most significant part of the e-mail message.

In some implementations, the most significant part of the e-mail message is determined based on an analysis of a most significant logical block of HTML, code from a plurality of the logical blocks of an HTML code of the e-mail message.

In some implementations, the most significant logical block of HTML code is a block of HTML code which comprises text the size of which is larger than the size of any other logical block of HTML code of the given e-mail message.

In some implementations, the most significant logical block of HTML code is a block of HTML code which comprise text; the text of the most significant logical block of HTML code comprises the majority of meaningful lexical units in comparison with the text of any other logical block of HTML code of the given e-mail message.

In some implementations, the lexical unit is any of: (i) a word, (ii) a phrase, (iii) a sentence, (iv) a paragraph.

In some implementations, determining at least one lexical unit as a potential meaningless lexical unit comprises determining at least one meaningful lexical unit.

In some implementations, determining at least one lexical unit as a potential meaningless lexical unit is performed on the basis of the syntax analysis of one of: (i) an entire text of the text message and (ii) a part of the text of the text message.

In some implementations, the computer further executes receiving the text message.

In some implementations, an unique control sum is an ID of an unique lexical unit.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the term "e-mail message" includes a file with a text generated by the sender and intended for transmitting to one or more receiver by e-mail. An e-mail message is type of a text message.

In the context of the present specification, "source code" is a text of software application in any of programming languages or in a markup language which is human readable. In general source code is any input data for a translator. Source code is translated into executable code before running of a program by means of a compiler or it can be executed immediately by means of an interpreter.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer information storage medium" is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage medium, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, a "message analysis module" (parser) is a program or a part of the program executed on the corresponding hardware and able to execute a syntax analysis of a text. In some implementations, a message analysis module is able to execute a structural analysis of a text. The hardware may be one physical computer or one physical computer system, but neither is required to be the case with respect to the present technology. In the context of the present specification, a "message analysis module" is not intended to mean that every task (e.g. received instructions or requests) or any particular task will have been received, carried out, or caused to be carried out, by the same software and/or hardware; it is intended to mean that any number of software elements or hardware devices may be involved in carrying out any task or request, or in processing the results of any task or request.

In the context of the present specification, a term "lexical unit" may mean any word, phrase, collocation, paragraph, abbreviation, character, date, acronym (including commonly-accepted ones), lexically meaningful combining form of a compound word in a natural language and also their equivalent code notation and symbolic notation of an artificial language. A lexical unit can be established in a text of an e-mail message by numbers, letters, hieroglyphic symbols, special marks or it can be composed of them.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
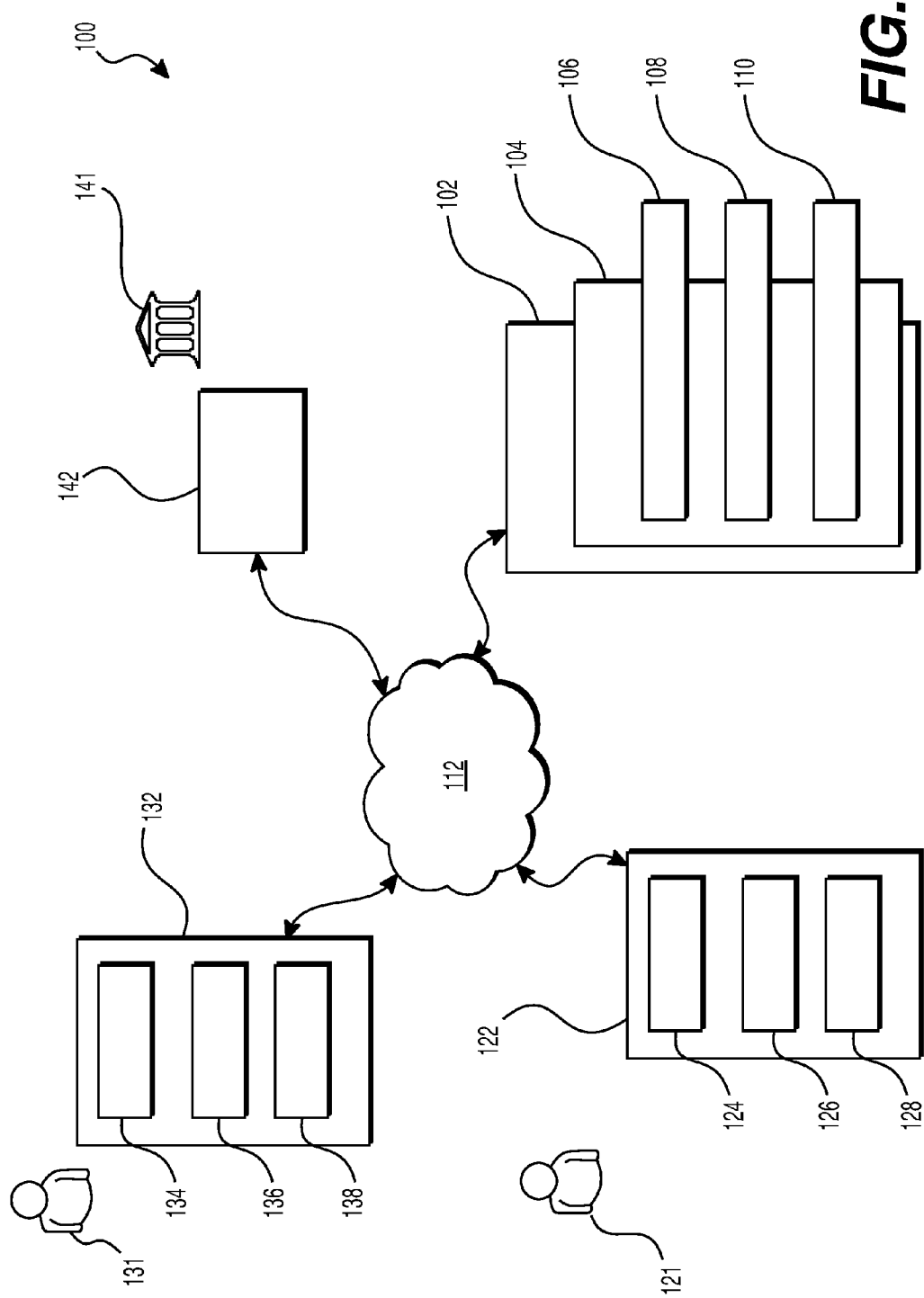
FIG. 1 is a schematic image depicting an implementation of a network computer system 100, the network computer system 100 being implemented in accordance with non-limiting embodiments of the present technology.

FIG. 1 depicts a schematic diagram of a network computer system 100, components of the network computer system 100 being connected with a communication network 112.

It is to be expressly understood that the network computer system 100 is depicted as merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the network computer system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network computer system 100 may provide in certain instances simple implementations of the present technology, and that where such is the case they have been presented in this manner as an aid to understanding. As persons skilled in the art would understand, various implementations of the present technology may be of a greater complexity.

The network computer system 100 comprises a mail server 102.

The mail server 102 can be a conventional computer server. In an example implementation the mail server 102 is a Dell™ PowerEdge™ server using Microsoft™ Windows Server™ operating system.

Needless to say, the mail server 102 can be implemented as any other suitable hardware and/or software application and/or firmware or combination thereof. In the non-limiting implementation being depicted herein, the mail server 102 is a single server. In other non-limiting implementation functionality of the mail server 102 can be distributed and the functionality can be performed by several servers.

In general the implementations of the mail server 102 are well known in the art. So, suffice it to state, that the mail server 102 comprises, inter alia, a network communication interface (not shown) for two-way communication over the communications network 112; and a processor (not shown) coupled to the network communication interface, the processor being configured to execute various routines, including those described herein below. To that end the processor may store or have access to computer readable commands which commands, when executed, cause the processor to execute the various routines described herein.

Tasks of the mail server 102 include receiving e-mail massages for the user 121, storage and transmission of e-mail messages to the user 121 from the mailbox.

A mail service can be implemented by any conventional means.

In alternative implementations of the present technology as a non-limiting example the network computer system 100 can comprise (either instead of the mail server 102 or additionally to the mail server 102) an IM (instant messages) server or SMS (Short Message Service) server or other text message server(s).

The mail server 102 is connected with the communications network 112 via a communication link (not separately numbered).

The mail server 102 comprises a storage media 104, which can be used by the mail server 102. Technically the storage media 104 can be storage media of any nature and kind whatsoever, including RAM, ROM, disks (CD-ROMs, DVDs, floppy disks, hard drivers, etc.), USB keys, solid state-drives, tape drives, etc. and combination thereof.

The storage media 104 of the mail server 102 is intended for storing a mail service module (not shown), the mail service module comprises user mailboxes (including a mailbox of the user 121), e-mail messages (including e-mail messages for the user 121 and e-mail messages for other users) and computer-executable instructions to keep the services and various modules up and running.

A mailbox is a part of drive space of the storage media 104 for storing of user e-mail messages (including e-mail messages for the user 121), the mailbox is being stored as a conventional file system catalog in the part of drive space. E-mail messages are data files being stored in the file system catalog.

The storage media 104 is also configured to store a message analysis module 106.

The message analysis module 106 is a program or a part of the program executed on the corresponding hardware and able to execute a syntax and structural analysis of a text. The hardware for the message analysis module 106 may be one physical computer or one physical computer system, but neither is required to be the case with respect to the present technology.

In the context, a "message analysis module 106" is not intended to mean that every task (e.g. received instructions or requests) or any particular task will have been received, carried out, or caused to be carried out, by the same software and/or hardware; it is intended to mean that any number of software elements or hardware devices may be involved in carrying out any task or request, or in processing the results of any task or request.

In the present context, a "syntax analysis" is a process of determining a grammatical tag of a linear sequence of text lexical units. The message analysis module 106 performs the syntax analysis for determining meaningful and meaningless lexical units in text messages, which text messages in this example are e-mail messages. In alternative implementations text messages can be instant messages, SMS etc.

Meaningless lexical units are lexical units without significant meaning for the user. For example, it can be titles, parenthetical words, pleasantries, senders' addresses and the like. In contrast, meaningful lexical units may have a significant meaning for the user.

In some implementations the message analysis module 106 performs the syntax analysis for determining meaningful and meaningless lexical units in text messages in such a way that the meaningful and meaningless lexical units have meaning.

In other words in the given implementation a lexical unit can have relatively logically completed meaning and carry individual meaning. For example, the text "Convention on the Civil Aspects of International Child Abduction" which is a part of the text "Please find enclosed the file with the text of "Convention on the Civil Aspects of International Child Abduction" [Ru, Eng] (Hague, Oct. 25, 1980) you ordered." can be a meaningful lexical unit. In contrast, the potential lexical unit "you" or "Civil Aspects" can be meaningless.

In some implementations the syntax analysis can be or can comprise an e-mail message source code analysis. The e-mail message source code analysis can comprise (as an example and not by way of limitation) an e-mail message markup analysis. The syntax analysis can be performed for determining an e-mail message type, detecting e-mail message templates and also for determining lexical units to check (among other things) them as potential meaningless lexical units and potential meaningful lexical units.

In some implementations the e-mail message markup analysis (further or alternatively) can include a font size analysis. Thus, for example, text parts with different font sizes may be considered to be different lexical units.

In some implementations the e-mail message markup analysis can include a font face analysis. For example, a phrase in italics, a phrase in bold, or underlined phrase can potentially be one lexical unit.

In some implementations the e-mail message markup analysis can include a punctuation mark analysis. For example, in some implementations separate, words are not considered as one lexical unit if there is a dot between them. In contrast, in some implementations a word sequence can be considered as one lexical unit if the word sequence is quoted and does not exceed a predefined number of words. In alternative implementations each sentence can be considered as a separate lexical unit.

In some implementations the e-mail message markup analysis can include a special mark analysis. For example, such a mark can be a paragraph mark, a tabulation mark, a page break mark and the like. In some implementations some of these marks can be considered as a sign of the fact that words, numbers and the like which are separated by these marks are not from the same lexical units. In contrast, the mark « @ » can be considered as a sign of the fact that surrounding (before this mark and next to this mark) letters, numbers and some other special marks (a dot, a dash, an underscore) are from the same lexical units (in this case an e-mail address).

In some implementations message analysis module 106 can process and classify results of the syntax analyses of one e-mail message and/or a specific group of e-mail messages and/or the entire plurality of e-mail messages sent for the users which have an e-mail account on the mail server 102.

Additionally or alternatively in some implementations the message analysis module 106 can process and classify the results of the syntax analyses of one e-mail message and/or specific group of e-mail messages and/or the entire plurality of e-mail messages which were written and/or sent by the users which have an e-mail account on the mail server 102. As a non-limiting example of lexical units classifying, the message analysis module 106 can group identical lexical units into groups and then define a number of lexical units in each group of lexical units.

The message analysis module 106 can also define a general number of lexical units in the entire plurality of e-mail messages sent to the user 121.

The message analysis module 106 can also define a general number of lexical units in the entire plurality of e-mail messages sent to all the users.

The message analysis module 106 can also define a general number of lexical units in the entire plurality of e-mail messages sent to specific user groups. Such groups can be user groups set by some characteristics. As non-limiting examples, the groups can be set using such criteria as age, gender, user location, user time zone, client device type. Corresponding information about age, gender, location, client device type can be obtained from any available source. As non-limiting examples, such sources can be data from a mail service account (age, gender, location and the like), IP (location), data obtained by a client device mail agent.

The message analysis module 106 can also define a general number of lexical units in the entire plurality of e-mail messages sent by a sender of a specific type to all the users of to a user group. As non-limiting examples, the sender types can include: lending financial institutions (for example, banks, savings banks, credit unions), insurance companies, on-line shops, booking web-sites (for example, flight ticket booking, train ticket booking, theater ticket booking and the like), social networks (for example, Facebook™, Twitter™, LinkedIn™, Vkontakte™, Odnoklassniki™).

The message analysis module 106 can also define types of messages from a specific sender. As a non-limiting example, types of messages can be defined when the sender performs a mass distribution of a significant number of standardized messages using different templates. As a non-limiting example, it can be messages of different types sent by Facebook™ social network.

In respect of the standardized messages of senders which performs a mass distribution of e-mail messages the message analysis module 106 can further or alternatively execute the following operations: receiving a plurality of specific sender's e-mail messages to a plurality of e-mail users which have mail accounts on the mail server 102; performing the syntax analysis of the plurality of specific sender's e-mail messages and determining types of the specific sender's e-mail messages; subdividing the specific sender's e-mail messages into paragraphs; including a plurality of paragraphs into the lexical unit database 108 and/or the lexical unit database 110 and each paragraph from the plurality of the paragraphs is associated with an ID of the given specific sender and with an ID of at least one type of an e-mail message of the sender.

Then when the user 121 receives an e-mail message from such a specific sender the message analysis module 106 can execute: receiving an e-mail message from a specific sender which performs a mass distribution of messages; determining a type of the specific sender's e-mail message; performing the syntax analysis of the e-mail message and subdividing the body of the e-mail message into plurality of paragraphs; checking at least one paragraph using at least one lexical unit database to determine if the given paragraph is meaningful for the given type of the e-mail message from the sender.

Then the message analysis module 106 can calculate a lexical unit weight.

The calculation of the lexical unit weight can be executed in respect to the entire array of the e-mail messages sent to the user 121. In this case the calculation can be performed using the first formula:

$$F_{lu1\text{-}user121} = Q_{lu1\text{-}user121}/Q_{user121} \qquad \text{Equation 1}$$

where $F_{lu1\text{-}user121}$—weight of the first lexical unit in the entire array of the e-mail messages sent to the user 121.

$Q_{lu1\text{-}user121}$—frequency of use of the first lexical unit in the entire array of the e-mail messages sent to the user 121 and $Q_{user121}$—total amount of lexical units in the entire array of the e-mail messages sent to the user 121.

The calculation of the lexical unit weight can be executed by the message analysis module 106 also in respect to the entire array of the e-mail messages sent to all the users which have mail accounts on the mail server 102. In this case the calculation can be performed using the second formula:

$$F_{lu1\text{-}all} = Q_{lu1\text{-}all}/Q_{all} \qquad \text{Equation 2}$$

where $F_{lu1\text{-}all}$—weight of the first lexical unit in the entire array of the e-mail messages sent to all the users which have mail accounts on the mail server 102.

$F_{lu1\text{-}all}$—frequency of use of the first lexical unit in the entire array of the e-mail messages sent to all the users which have mail accounts on the mail server 102.

$F_{lu1\text{-}all}$—total amount of the first lexical unit in the entire array of the e-mail messages sent to all the users which have mail accounts on the mail server 102.

Alternatively or additionally the lexical unit weight can be calculated by the message analysis module 106 separately in respect to one of: 1) different sender types; 2) or different user group, 3) or in respect to a given type of a given mass sender, 4) different combinations of different sender types and different user group, the user 121 alone and/or the entire plurality of receivers.

Alternatively or additionally while calculating lexical unit weights the message analysis module 106 can take into account only some paragraphs of each e-mail message, and not the entire text of e-mail messages. A maximum number of such paragraphs can be predefined. In case when an e-mail message includes fewer paragraphs than the predefined number of paragraphs then the entire text of the message can be used for calculating lexical unit weights.

Alternatively or additionally while calculating lexical unit weights the message analysis module 106 can take into account certain number of leading (from the beginning) paragraphs of each e-mail message, and not the entire text of e-mail messages. A maximum number of such leading paragraphs can be predefined. In case if an e-mail message includes fewer paragraphs than the predefined number of paragraphs then the entire text of the message can be used for calculating the lexical unit weights.

Alternatively or additionally while calculating lexical unit weights the message analysis module 106 can take into account most significant parts of e-mail messages (as it is described below), and not the entire text of the e-mail messages.

Thus, in some implementations, weight of the same lexical unit can differ depending on an array which was used to calculate the weight value and depending on a text which was used to calculate the weight value (entire texts of the e-mail messages or most significant parts of e-mail messages) and depending on a type of the fragment.

A lexical unit weight can be used for generating different databases and while determining if a lexical unit is meaningful or meaningless in a database.

In some implementations the message analysis module 106 can determine a control sum of lexical units. In the implementation the lexical unit control sum is a combination of the following elements: a number of words in the lexical unit, a number of letters in the lexical unit, a number of numbers in the lexical unit, a number of dots in the lexical unit, a number of commas in the lexical unit.

In alternative implementations, as a non-limiting example, the lexical unit control sum can be defined as a size of the corresponding lexical unit in bytes. In alternative implementations, the lexical unit control sum can be defined by a combination of any possible control elements such as a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units and the like.

In some implementations the message analysis module 106 can index lexical units.

In the implementation the message analysis module 106 can further execute a structural analysis of an e-mail message.

In the implementation a "structural analysis" is intended to mean a process of analyzing an e-mail message structure. In the implementation analyzing an e-mail message structure is performed by means analyzing HTML, markup of an e-mail message. Such an analysis allows to define logical blocks of HTML code with text. Such blocks, for example, can be large text blocks with a text, with a table cell text, paragraphs of text and the like. During the markup analysis of the e-mail message different tags can be used, such as, for example, <div align="?"></div> (text formatting tags), <table></table> (table tags), <td></td> (table cell tags), <p></p> (paragraph tags) and the like.

The message analysis module 106 interacts with the first lexical unit database 108.

The first lexical unit database 108 is a structured data collection which includes lexical units. The first lexical unit database 108 is populated using the same hardware as used for a process which performs information storage or use; the information is recorded in the first database 108. However, as will be appreciated by those of skill in the art, the first lexical unit database 108 can also be implemented using separate hardware such as a single-unit server or a plurality of servers.

In the implementation, the first lexical unit database 108 is a database which was generated using results of a syntax analysis of the entirety of the e-mail messages sent to the user 121 and received by the user 121 during lifetime of the account of the user 121 with the mail server 102. In alternative implementations, the first lexical unit database 108 can be generated using results of a syntax analysis of the entirety of all the e-mail messages sent to the user 121 and received by the user 121 during a specific period, for example, during the preceding year. As those skilled in the art will understand, such a period can be any period, more than one year or less than one year.

Each of the plurality of the lexical units from the first database 108 can be marked as a meaningful lexical unit or as a meaningless lexical unit.

In alternative implementations, meaningful lexical units and meaningless lexical units can be stored in the same database with an indication of their weight or with an indication of their different weights calculated using different criteria as it will be described below. Thus, determining a lexical unit as meaningful or meaningless can be performed by accessing the database and comparing a specific corresponding weight of corresponding lexical units with a corresponding predefined threshold value. Thus, in some implementations a lexical unit from a plurality of lexical units from a lexical unit database is meaningless if its weight exceeds a predefined threshold value. Since the lexical unit weight and the predefined threshold value are present in the database it is possible to define the lexical unit as meaningful or meaningless directly by accessing the database.

In some alternative implementations meaningful lexical units and meaningless lexical units can be stored in a separate database.

In other alternative implementations, the first lexical units database 108 can store only meaningless lexical units.

Lexical units from the first lexical units database 108 can be associated with their weight calculated using the first formula, i.e. a weight in relation to the entire array of the e-mail messages sent to the user 121 for the lifetime of the account of the user 121 on the mail server 102. In alternative implementations, lexical units from the first lexical units database 108 can be associated with their weight calculated using the first formula, i.e. a weight in relation to the entire array of the e-mail messages sent to the user 121 for a predefined preceding period.

The message analysis module 106 also interacts with the second lexical unit database 110.

The second lexical unit database 110, much akin to the first lexical unit database 108 is a structured data collection which includes lexical units. The second lexical unit database 110 is implemented using the same hardware as used for performing information storage or use; the information is recorded in the database. However, as will be appreciated by those of skill in the art, the second lexical unit database 110 much akin to the first lexical unit database 108 can be implemented also using separate hardware such as a single-unit server or plurality of servers.

In the implementation, the second lexical unit database 110 is a database was generated using results of a syntax analysis of the plurality of all the e-mail messages sent to all the users which have mail accounts on the mail server 102 and received by these users during lifetime of their accounts. In alternative implementations, the second lexical unit database 110 is a database can be generated using results of a syntax analysis of the plurality of all the e-mail messages sent to all the users which have mail accounts on the mail server 102 and received by these users during the preceding year. As those skilled in the art will understand, such a period can be any period, more than one year or less than one year.

Each of the plurality of the lexical units from the second database 110 can be marked as a meaningful lexical unit or as a meaningless lexical unit. In some alternative implementations meaningful lexical units and meaningless lexical units can be stored in separate databases. In other alternative implementations, the database can store only meaningless lexical units.

In the second lexical units database 110 stores the information associated with weights of the lexical units which weights were calculated using the second formula, i.e. a weight in relation to the entire array of the e-mail messages sent to all the e-mail users which have accounts on the mail server 102. In the implementation all the e-mail messages received during the lifetime of each account of each user which has an account on the mail server 102 are taken into account. In alternative implementations, the e-mail messages received during the preceding year are taken into account. As those skilled in the art will understand, such a period can be any period, more than one year or less than one year.

Speaking of the mail server 102 in general it is to be expressly understood that the different implementations of the mail server 102 are provided for illustration purposes only. Thus, those skilled in the art will understand details of other specific implementations of mail servers which can be used for implementations of the present technology. Thus, the example presented here is not a limitation of embodiments of the present technology.

The mail server 102 is connected with the communications network 112 over a communication link (not separately numbered). In some non-limiting implementations the communication network 112 can be the Internet. In other implementations the communication network 112 can be implemented alternatively as a wide area network or local area network, private network and the like.

How the communication network 112 is implemented is not particularly limited and it depends on which devices are coupled to the communication network 112. As a non-limiting example, a connection of the mail server 102 to the communication network 112 can be performed using wireless communications or an Ethernet-based connection.

The mail server 102 is connected to the first client device 122 via the communication network 112.

The first client device 122 is typically associated with the user 121. The user 121 is a person who has an e-mail account on the mail server 102.

It should be noted that the fact that the first client device 122 is associated with the user 121 does not need to suggest or imply any specific mode of operation.

Depicted in FIG. 1 the first client device 122 is implemented as Dell™ Precision T1700 MT CA033PT170011RUWS PC with Intel® Xeon™ processor, CPU frequency 3300 MHz, video card nVIDIA Quadro K2000, running the Windows 7® Pro 64-bit operating system, the operating system installed and active. However, as those skilled in the art will understand, the implementation of the first client device 122 is not particularly limited. The first client device 122 may be implemented as a personal computer (desktops, laptops, netbooks, etc.), a wireless communication device (a cell phone, a smartphone, a tablet and the like), as well as other equipment.

The first client device 122 includes the storage media 124 implemented as a 500 Gb hard drive. However, as those skilled in the art will understand, the storage media 124 can be implemented as storage media of any nature and kind whatsoever, including RAM, ROM, disks (CD-ROMs, DVDs, floppy disks, hard drivers, etc.), USB keys, solid state-drives, tape drives, etc and combination thereof.

The storage media 124 can store user's files and program instructions. More specifically, the storage media 124 can store software which execute functions of the browser 126. Generally, the purpose of the browser 126 is to enable the user 121 to connect to the mail server 102 and receive e-mail messages by means of a web-interface and show received and sent e-mail messages on a display 128. In the first client device 122 the browser 126 is implemented as the mobile browser Yandex™. However, as those skilled in the art will understand, the implementation of the browser 126 is not particularly limited. As non-limiting examples such browsers can be Yandex™ browser, Google Chrome™, Internet Explorer™, various mobile search applications and the like. It should be expressly understood that any other commercially available or proprietary application may be used for implementing non-limiting embodiments of the present technology.

The first client device 122 further includes the display 128 implemented as a 21.5" Dell™ E2214H 2214-7803, 1920×1080 screen resolution, which can provide video information to the user 121. Thus, the user 121 is able to see on the display 128 in the interface of the browser 126 of the first client device 122 various objects, incoming and outgoing e-mail messages, and abstracts of the incoming e-mail messages.

The mail server 102 is connected to a second client device 132 via the communication network 112.

The second client device 132 is typically associated with the user 131. In this example the user 121 is an individual person who utilizes his e-mail account for personal use purposes and sends (using the given account) personal e-mail messages. The structure and characteristics of a private e-mail message can differ from the structure and characteristics of e-mail messages of other types (for example, from e-mail messages which include, for example, e-tickets, promotions and other deals). Thus, computer methods of processing and analyzing e-mail messages carried out by the message analysis module 106 of the mail server 102 can identify and classify the messages sent by the user 131 to the user 121 as private messages.

The user 131 can be a sender of e-mail messages to various users, including the user 121 and/or other users who have e-mail accounts on the mail server 102 or on any other mail server.

An e-mail account of the user 131 can be hosted on any suitable mail server, including the mail server 102.

It should be noted that the fact that the second client device 132 is associated with the user 131 does not need to suggest or imply any specific mode of operation.

To send e-mail messages the user 131 uses the second client device 132 implemented as an Apple™ iPhone 5S smartphone running iOS 7 operating system (installed and active), with Bluetooth, Wi-Fi, 3G, LTE, GPS (global position system). However, as those skilled in the art will understand, the implementation of the second client device 132 is not particularly limited. The second client device 132 may be implemented as a personal computer (desktops, laptops, netbooks, etc.), a wireless communication device (a cell phone, a smartphone, a tablet and the like), as well as other equipment.

The second client device 132 includes the storage media 134 implemented as a 500 Gb hard drive. However, as those skilled in the art will understand, the storage media 134 of the second client device 132 can be implemented as storage media of any nature and kind whatsoever, including RAM, ROM, disks (CD-ROMs, DVDs, floppy disks, hard drivers, etc.), USB keys, solid state-drives, tape drives, etc and combination thereof.

The storage media 134 of the second client device 132 can store user's files and program instructions. More specifically, the storage media 134 of the second client device 132 can store software which execute functions of an e-mail client 136. Generally, the purpose of the e-mail client 136 is to enable the user 131 to connect to the mail server (in some cases it can be the mail server 102) and receive e-mail messages by means of the web-interface of the e-mail client 136 and show received and sent e-mail messages on the display 138. On the second client device the e-mail client 136 is implemented as Triage™. However, as those skilled in the art will understand, the implementation of the e-mail client 136 is not particularly limited. As non-limiting examples such e-mail clients can be Mailbox™, Evomail™, Dispatch™, Inky Mail™ Seed™, myMail™, Boxer™ etc. Further in alternative implementations the functions of the e-mail client (i.e. message receiving and sending, e-mail message demonstration using the display 138) can be executed using a web-browser. It can be executed using any web-browser, for example, Yandex™ browser, Google Chrome™, Internet Explorer™, and the likeon the like, It should be expressly understood that any other commercially available or proprietary application may be used for implementing non-limiting embodiments of the present technology.

The second client device 132 further includes the display 128 which is a 4" touch screen with 640×1136 resolution, which allows to provide information to the user 131 and which can be used as an input device. Thus, the user 131 is able to see on the display 128 in the interface of the browser 126 of the second client device 132 various objects, incoming and outgoing e-mail messages, and abstracts of the incoming e-mail messages.

The mail server 102 is connected to a third client device 142 via the communication network 112.

The third client device 142 is usually associated with the user 141.

In this example the user 141 is an employee of a marketing company, which user uses his e-mail account for the purpose defined by clients of the marketing company. Thus, the third client device user 141 can send a plurality of e-mail messages from the client device 142 which messages can be classified and grouped into some conventional groups using specific parameters. For example, various e-mail messages sent by the user 141 using the client device 142 can be classified as adverts and/or information messages and/or transactional message and/or personal notifications and the like. The message classification can be carried out by means of both an analysis of message contents using key words, specific terms and an analysis of an e-mail message code, for example, markup characteristics, and determining the usage of specific HTML-templates and the like.

An HTML-template can be a message layout, including the HTML-formatting which sets a design and location of all the design elements. Thus, computer e-mail processing and analyzing methods carried out by the message analysis module 106 of the mail server 102 can identify and classify the messages sent by the user 141 from the client device 142 to the user 121 as adverts and/or information messages and/or transactional message and/or personal notifications and the like. Further computer e-mail processing and analyzing methods carried out by the message analysis module 106 of the mail server 102 can identify in such a message logical block of the HTML-code including HTML-code blocks which comprise text.

The user 141 can be a sender of e-mail messages to various users, including the user 121 and/or other users who have e-mail accounts on the mail server 102 or on any other mail server.

An e-mail account of the user 141 can be hosted on any suitable mail server, including the mail server 102.

It should be noted that the fact that the third client device 142 is associated with the user 141 does not need to suggest or imply any specific mode of operation.

Much akin to the first client device 122 and the second client device 132 the third client device 142 includes a storage media (not depicted). The third client device 142 can execute a web-browser and/or e-mail client (not depicted. The third client device 142 can also comprise a display (not depicted). As those skilled in the art will understand, implementations of the third client device 142 are not particularly limited and well-known in the art. The third client device 142 may be implemented as a personal computer (desktops, laptops, netbooks, etc.), a wireless communication device (a cell phone, a smartphone, a tablet and the like), as well as other equipment. Hence, the third client device 142 will not be described in details.

As those skilled in the art will understand, a number of users sending e-mail messages to the user 121 and to other users which have accounts on the mail server 102 will be much more than two users 131 and 141 depicted herein.

As those skilled in the art will understand, a number of client devices from which e-mail messages are sent to the user 121 and to other users which have accounts on the mail server 102 will be higher than two client devices 132 and 142.

In alternative implementations the first client device 122, the second client device 132 and the third client device 142 can be implemented in such a way that they will be able to sent other text massages, and the teachings presented herein should not be limited to e-mail messages. Thus, for example, the first client device 122, the second client device 132 and the third client device 142 can be implemented as mobile phones which allow to perform sending and receiving SMS messages and which allow to perform the syntax analysis of text messages.

Figure 2:
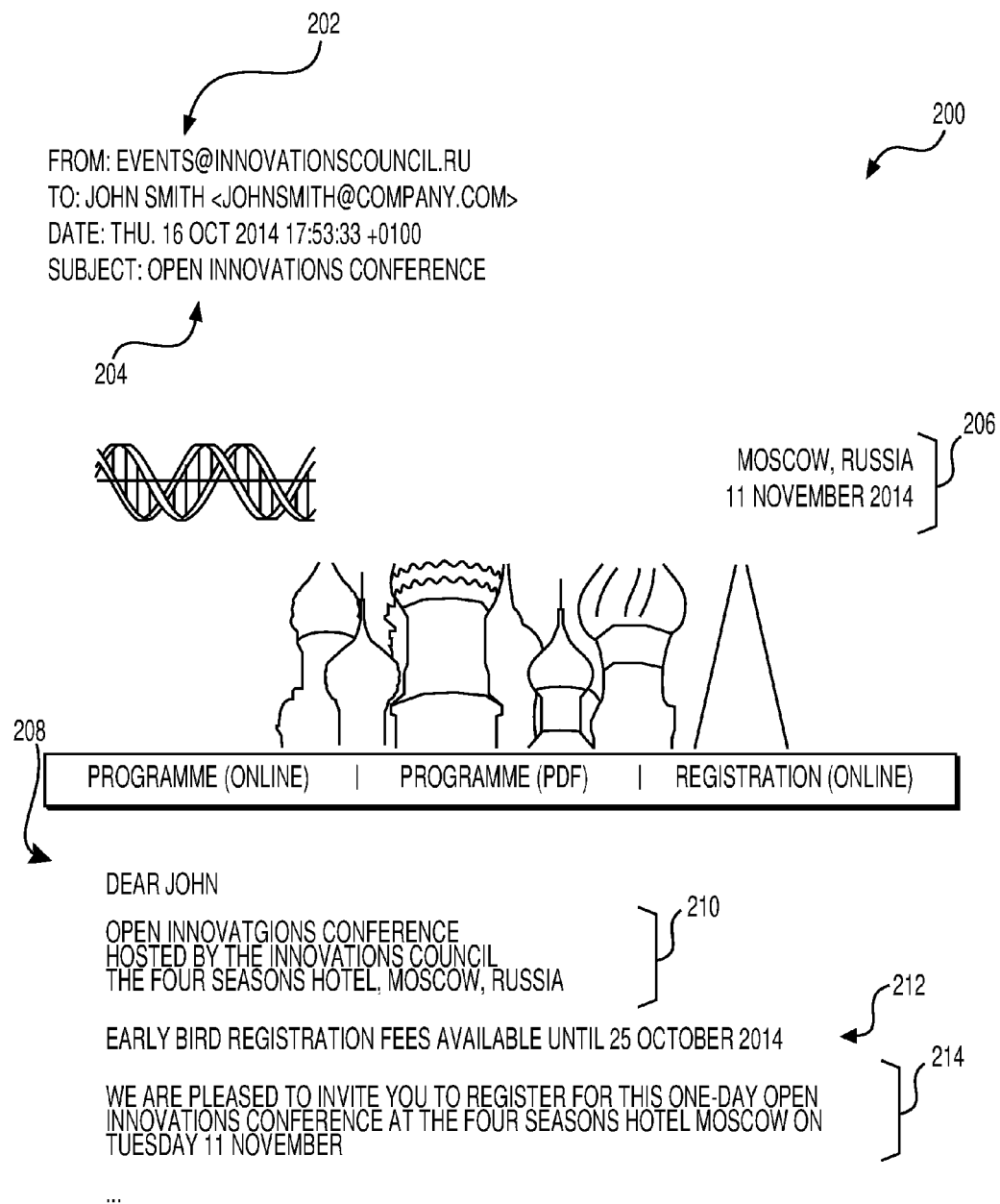
FIG. 2 depicts a text of an e-mail message 200, the e-mail message 200 was sent by a user 141 of FIG. 1 to an user 121 depicted in FIG. 1.

FIG. 2 is an illustration of an e-mail message 200 sent by the user 141 from the client device 142 depicted in FIG. 1 to an user 121 depicted in FIG. 1.

The e-mail message 200 comprises a sender's e-mail address 201. In this example the sender of the e-mail message 200 is the user 141.

The e-mail message 200 also comprises a name 202 (John Smith) and a receiver's e-mail address (johnsmith@company.com). In this example the receiver of the e-mail message 200 is the user 121.

The e-mail message 200 also comprises a subject 204 of the e-mail message 200. In this example the subject 204 of the e-mail message 200 is «Moscow, 11 Nov. 2014: Open Innovations Conference».

Below a line with the subject 204 of the e-mail message 200 there is provided an e-mail message body (not separately numbered). The e-mail message body comprises images and text. More specifically, the e-mail message body comprises text fragments 206, 208, 210, 212 И 214, which as non-limiting examples, from the HTML-structure of the e-mail message 200 perspective, can be separate paragraphs and/or separate tables, and/or separate table cells.

Figure 3:
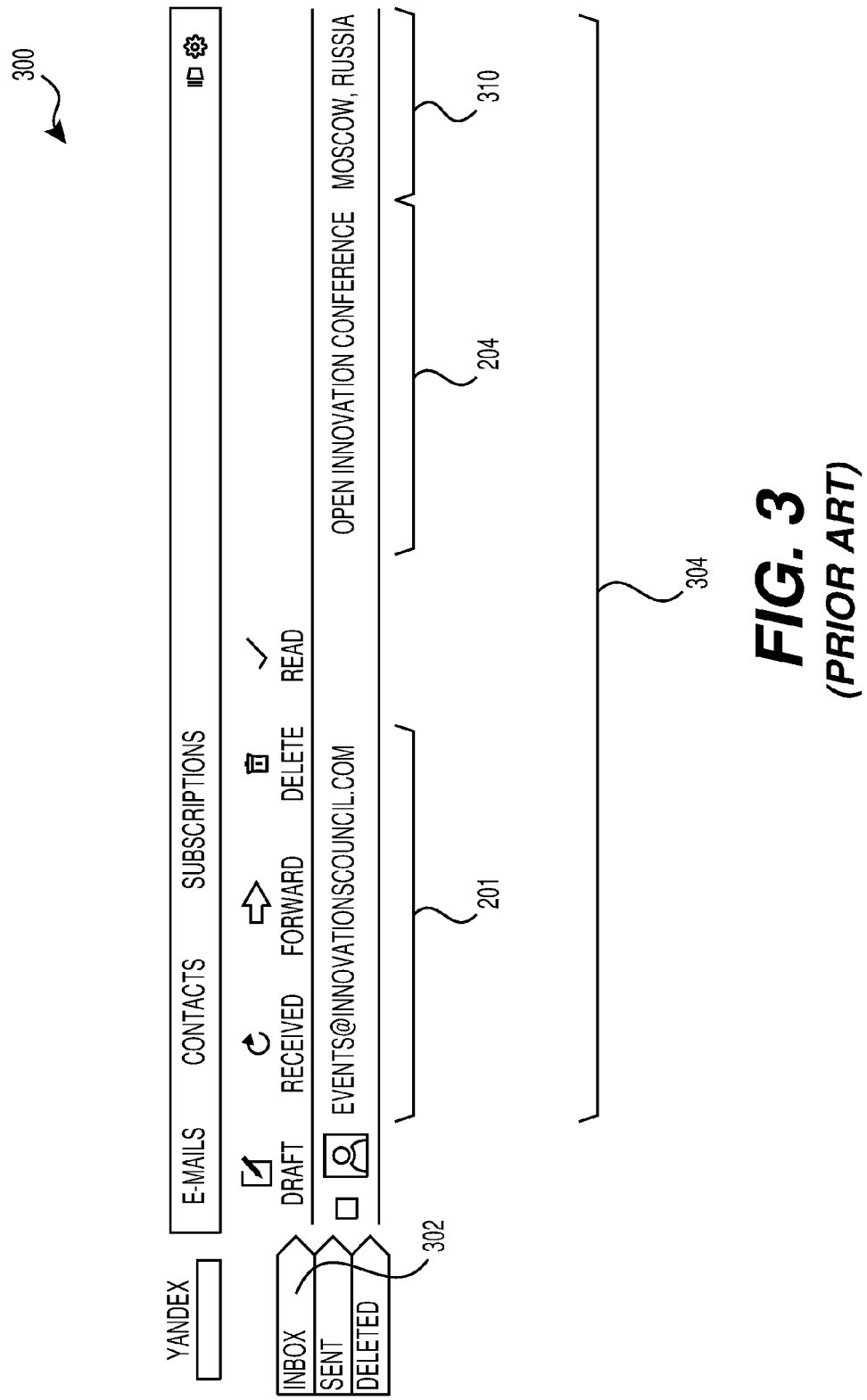
FIG. 3 depicts a portion of a web interface of e-mail service (prior art).

FIG. 3 is an image of a fragment of a web-interface 300 of the e-mail service of the user 121, in which an «Inbox» tab 302 (i.e. a tab of incoming messages) is active. FIG. 3 is an image of the fragment of the web-interface 300 of the e-mail service, the web-interface 300 implemented in accordance with known techniques.

As the fragment of the web-interface 300 of the e-mail service shows the user 121 received the e-mail message 200, shown in FIG. 2 from the user 141 depicted in FIG. 1. In the web-interface 300 a line 304 including the sender's e-mail address 201 is displayed. In this example the sender of the e-mail message 200 is the user 141.

The line 304 also comprises the subject 204 of the e-mail message 200.

The line 304 also comprises an abstract 310 of the incoming e-mail message 200 «Moscow, Russia», which is the text of the first line of the text 206, placed in the very beginning of the body of the e-mail message 200. The abstract 310 of the incoming e-mail message is an abstract which includes any lexical units—both potentially meaningful and potentially meaningless. The abstract 310 of the incoming e-mail message is generated without performing the HTML-structure analysis of the e-mail message 200 and without performing the lexical analysis of texts from HTML-code logical blocks of the e-mail message 200.

Figure 4:
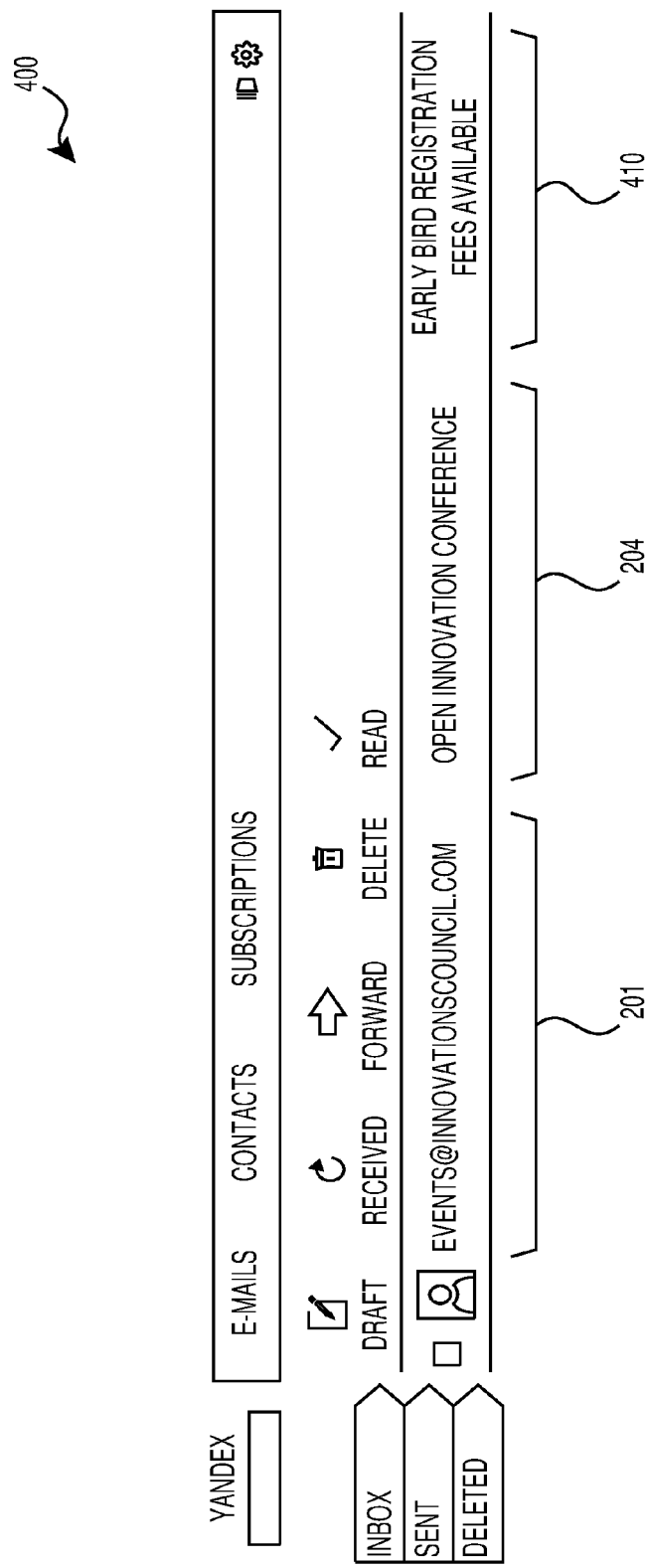
FIG. 4 depicts portion of a web interface 400, the web interface being implemented in accordance with non-limiting embodiments of the present technology.

FIG. 4 is an image of a fragment of a web-interface 400 of the e-mail service of the user 121, in which an «Inbox» tab 402 (i.e. a tab of incoming messages) is active. FIG. 4 is an image of the fragment of the web-interface 400 of the e-mail service as it can be implemented in accordance with one of non-limiting implementations of the present technology.

The fragment of the web-interface 400 of the e-mail service shows the user 121 received the e-mail message 200 from the user 141 and the client device 142. In the web-interface 400 a line 404 including the sender's e-mail address 201 is displayed. In this example the sender of the e-mail message 200 is the user 141.

The line 404 also comprises the subject 204 of the e-mail message 200.

The line 404 also comprises an abstract 410 of the incoming e-mail message 200 «Early bird registration fees available», which is a part of the text 212, placed in the middle of the e-mail message 200. The abstract 410 of the incoming e-mail message 200 is an abstract which includes meaningful lexical units. The abstract 410 of the incoming e-mail message is generated with performing the HTML-structure analysis of the e-mail message 200 and with performing the lexical analysis of texts from HTML-code logical blocks of the e-mail message 200.

Figure 5:
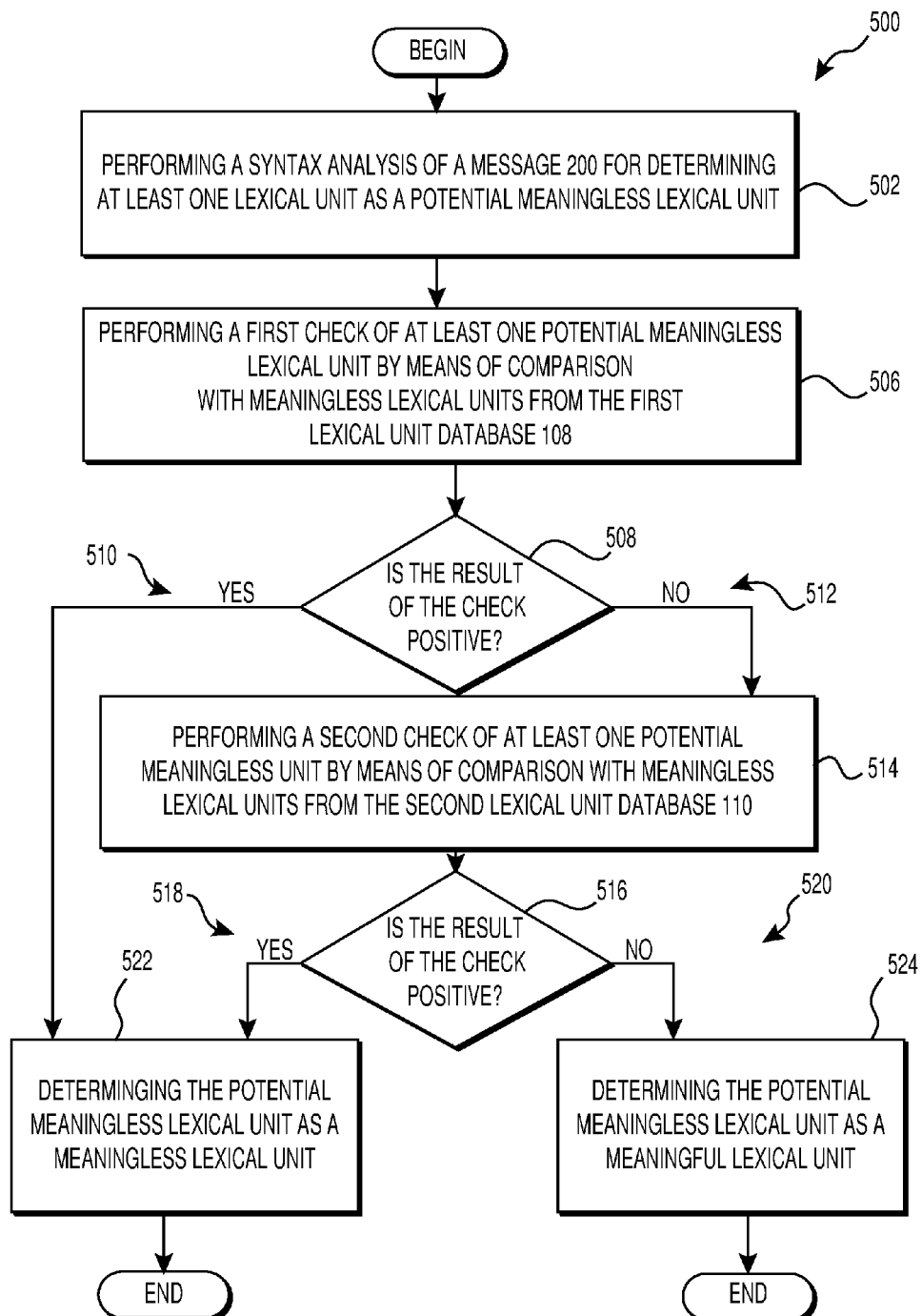
FIG. 5 is a block-diagram of a method 500 executed on a mail server 102 of the system of FIG. 1, the method being implemented in accordance with non-limiting embodiments of the present technology.

FIG. 5 is a block-diagram of a method 500 executed on the mail server 102 of FIG. 1 and implemented in accordance with non-limiting embodiments of the present technology. A method 500 is a method of computer processing of an incoming text message sent to a user and in the given implementation of the present technology—of the e-mail message 200, which includes text which includes meaningful and meaningless lexical units.

In implementations of the present technology the method 500 can be executed on the mail server 102 depicted in FIG. 1. For this purpose the mail server 102 includes the storage media 104 which stores computer-readable instructions, which when executed, are configured to cause the mail server 102 to execute the steps of the method 500. However, as those skilled in the art would understand, the method 500 can be executed on other servers.

In this implementation which is described in a block diagram of the method 500, the mail server 102 receives from a plurality of users of variety of e-mail services messages sent to different users, including the user 121.

Step 502—performing the syntax analysis of the e-mail message 200 and determining at least one lexical unit as a potential meaningless lexical unit.

The method 500 begins at step 502, where the mail server 102 depicted in FIG. 1 performs the syntax analysis of the e-mail message 200. The message analysis module 106 performs the syntax analysis for determining meaningful and meaningless lexical units in the e-mail message 200.

In this implementation, performing the syntax analysis of the e-mail message 200 includes the markup language analysis of the e-mail message 200. Thus, in this implementation, the markup language analysis of the e-mail message 200 includes the analysis of a font type, a font size, a font face, punctuation marks and special marks.

During the analysis of punctuation marks and special marks some sentences can be detected as separate lexical units. Further, the sentence determination can be a basis for further analysis using the analysis of a font type, a font size, a font face. An indication of the end of a sentence can be both punctuation marks (for example, a dot, an exclamation mark, an ellipsis and the like) and special marks (for example, a paragraph mark, a tabulation mark, a page break mark and the like).

During the analysis of a font type, a check of different font types of different text parts is being performed. Such an analysis can be used for detecting lexical units. The fact that two text parts are written using different font can be a sign of the fact that these two text parts do not belong to the same lexical unit.

During the analysis of a font size and face type it can be detected that there are parts of sentences which are written using different font sizes and/or font faces (for example, in italic type and/or in bold type). Such an analysis can allow to identify marked parts of a sentence as separate lexical units.

In this implementation performing the syntax analysis of the e-mail message 200 includes performing the syntax analysis of the most significant part of the e-mail message 200 and does not include performing the syntax analysis of other parts of the e-mail message 200. In alternative implementations performing the syntax analysis of the e-mail message 200 can be performed using the entire text of the e-mail message or using separate parts of the message (for example, the first three paragraphs, or the first two paragraphs after a paragraph with a title or parts of the analysis can be chosen using any other parameter).

Detecting at least one lexical unit as a potential meaningless lexical unit.

Detecting at least one lexical unit as a potential meaningless lexical unit can be a result of performing the syntax analysis of the e-mail message 200.

The lexical unit can be a separate word in any form. For example the word "Hi" is a lexical unit.

A separate sentence can be a lexical unit as well. For example, the sentence "Your order is delivered" can be a lexical unit.

A phrase from a sentence can be a lexical unit. For example, in the sentence "Your order is delivered; please collect a parcel from your local Post Office at the below mentioned address", the phrase "Your order is delivered" can be a lexical unit.

A paragraph from the e-mail message can be a lexical unit.

In this implementation lexical units can carry a meaning. Thus, for example, the lexical units described above are meaningful, i.e. can be considered as some complete informational units. However in alternative implementations lexical units do not necessarily carry meaning. It also can be, for example, word combinations which can be incomplete informational units per se, out of context of other words and word combinations.

Determining lexical units which have meaning can be performed using the syntax analysis of the e-mail message 200.

In this implementation, as it was mentioned above, performing the syntax analysis includes the markup language analysis of the e-mail message 200.

In alternative implementations, determining at least one lexical unit as a potential meaningless lexical unit can be performed using other methods. For example, for determining a lexical unit aside from the markup analysis of the e-mail message 200 itself an additional check for the presence in the first line of the words typical for a title (for example, "Dear", "Good morning" "Hi" and the like) can be executed. The presence of such key words in combination with some markup templates can be used for determining lexical units.

The method 500 then proceeds to step 506.

Step 506—performing a first check of at least one potential meaningless lexical unit by means of comparison with meaningless lexical units from the first lexical unit database 108.

Next, at step 506 a first check of at least one potential meaningless lexical unit by means of comparison with meaningless lexical units from the first lexical unit database 108 is performed. In the implementation, the first lexical unit database 108 is a database which was generated using results of a syntax analysis of the entirety of the e-mail messages sent to the user 121 and received by the user 121 during lifetime of the account of the user 121 on the mail server 102. In alternative implementations, the first lexical unit database 108 can be generated using results of a syntax analysis of the entirety of the e-mail messages sent to the user 121 and received by the user 121 during a specific period, for example, for the preceding year. As those skilled in the art will understand, such a period can be any period, more than one year or less than one year.

In this implementation each of the plurality of the lexical units from the first database 108 is marked as a meaningful lexical unit or as a meaningless lexical unit. Matching the potential meaningless lexical units will be performed with the meaningless lexical units. The presence of meaningful lexical units in the first database 108 can be based on the fact that weight of all the lexical units in the first database 108 can be adjusted as new messages arrive and as analysis of these messages is performed. Accordingly, the presence of meaningful lexical units in the first database 108 can be necessary for calculating and re-calculating weight of these lexical units and if the weight exceeds the predefined threshold value a meaningful lexical unit from the first database 108 can be considered as a meaningless lexical unit.

Thus, performing the first check of at least one potential meaningless lexical unit by means of comparison with meaningless lexical units from the first lexical unit database 108 allows determining meaningfulness or meaninglessness of the potential meaningless unit using the database which was generated in relation to a plurality of e-mail messages sent to the user 121. Thus, the determination is made is the potential meaningless unit is meaningful or meaningless specifically to the given user 121.

In this implementation matching the potential meaningless lexical unit with meaningless lexical units from the first lexical unit database 108 is performed by means of comparison a potential meaningless lexical unit with meaningless lexical units from the first lexical unit database 108 using a predefined parameter.

In this implementation such a parameter can be a sequence of characters in the potential meaningless lexical unit and in the lexical units from the first lexical unit database 108. In other words, the check of the potential meaningless lexical unit by means of comparison with meaningless lexical units from the first lexical unit database 108 is performed character by character.

In some implementations the potential meaningless lexical units and meaningless lexical units from the first lexical unit database 108 can have control sums. These control sums can be preliminary calculated and represented in bytes. In relation to the potential meaningless lexical units and lexical units from the first lexical unit database 108 which have the control sums the check can be performed in two stages. In the first stage a control sum of the potential meaningless lexical unit is compared with the control sums of the lexical units from the first lexical unit database 108. If the control sum of the potential meaningless lexical unit is the same as a control sum of any of the meaningless lexical units from the first lexical unit database 108 then in some implementations the potential meaningless lexical unit is immediately defined as a meaningless lexical unit. In alternative implementations if the sums are the same then the method proceeds to execution of an additional step where verifying by the mean of character by character comparison of the potential meaningless lexical unit with a lexical units from the first lexical unit database 108 which control sum is the same as the control sum of the potential meaningless lexical unit is performed.

At step 508 based on the results of the check one of the two decisions is made. In case the result of the check is positive (step 510), i.e. when the check shows that the potential meaningless lexical unit is the same as any of the meaningless lexical unit from the lexical unit database 108, the method proceeds to step 522 where the potential meaningless lexical unit is defined as a meaningless lexical unit. Considering the potential meaningless lexical unit as a meaningless lexical unit causes that fact that thereafter when generating the abstract of the e-mail message 200 the given meaningless lexical unit is not included in this abstract. The method 500 then terminates.

In case the result of the check is negative (step 512), i.e. when the check shows that the potential meaningless lexical unit is not the same as any of the meaningless lexical unit from the lexical unit database 108, the method proceeds to step 514.

Step 514—performing a second check of at least one potential meaningless lexical unit by means of comparison with meaningless lexical units from the second lexical unit database 110

Next, at step 514 a second check of at least one potential meaningless lexical unit by means of comparison with meaningless lexical units from the second lexical unit database 110 is performed. In the implementation, the second lexical unit database 110 is a database was generated using results of a syntax analysis of the plurality of all the e-mail messages sent to all the users which have mail accounts on the mail server 102 and received by these users during lifetime of their accounts. In alternative implementations, the second lexical unit database 110 is a database can be generated using results of a syntax analysis of the entirety of the e-mail messages sent to all the users who have mail accounts with the mail server 102 and received by these users during the preceding year. As those skilled in the art will understand, such a period can be any period, more than one year or less than one year.

In this implementation each of the plurality of the lexical units from the second database 110 is marked as a meaningful lexical unit or as a meaningless lexical unit. Matching the potential meaningless lexical units will be performed with the meaningless lexical units. The presence of meaningful lexical units in the second database 110 can be based on the fact that weight of all the lexical units in the second database 110 can be adjusted as new messages arrive and as analysis of these messages is performed. Accordingly, the presence of meaningful lexical units in the second database 110 can be necessary for calculating and re-calculating weight of these lexical units and if the weight exceeds the predefined threshold value a meaningful lexical unit from the first database 110 can be considered as a meaningless lexical unit.

Thus, performing the second check of at least one potential meaningless lexical unit by means of comparison with meaningless lexical units from the second lexical unit database 110 allows to determine meaningfulness or meaninglessness of the potential meaningless unit in relation to the database which was generated in relation to the entirety of e-mail messages sent to all the users who have accounts with the mail server 102 and received by these users during the lifetime of these accounts. Thus, the determination that is made during this analysis is whether the potential meaningless unit is meaningful or meaningless for entirety of the users, and not specifically for the user 121.

In this implementation matching the potential meaningless lexical unit with meaningless lexical units from the second lexical unit database 110 is performed by means of comparison a potential meaningless lexical unit with meaningless lexical units from the second lexical unit database 110 using a predefined parameter.

In this implementation such a parameter can be a sequence of characters in the potential meaningless lexical unit and in the lexical units from the second lexical unit database 110. In other words, the check of the potential meaningless lexical unit by means of comparison with meaningless lexical units from the second lexical unit database 110 is performed character by character.

In some implementations the potential meaningless lexical units and meaningless lexical units from the second lexical unit database 110 can have control sums. These control sums can be pre-determined and expressed in bytes. In relation to the potential meaningless lexical units and lexical units from the second lexical unit database 110 which have the control sums the check can be performed in two stages. During the first stage a control sum of the potential meaningless lexical unit is compared with the control sums of the lexical units from the second lexical unit database 110. If the control sum of the potential meaningless lexical unit is the same as a control sum of any of the meaningless lexical units from the second lexical units database 110 then in some implementations the potential meaningless lexical unit is determined as a meaningless lexical unit. In alternative implementations if the sums are the same then the method proceeds to execution of an additional step where verifying by the mean of character by character comparison of the potential meaningless lexical unit with a lexical units from the second lexical unit database 110 which control sum is the same as the control sum of the potential meaningless lexical unit is performed.

At step 516 based on the results of the check one of the two decisions is made. In case the result of the check is positive (step 518), i.e. when the check shows that the potential meaningless lexical unit is the same as any of the meaningless lexical unit from the second lexical unit database 110, the method proceeds to step 522 where the potential meaningless lexical unit is defined as a meaningless lexical unit. Determining that the potential meaningless lexical unit as a meaningless lexical unit causes that fact that thereafter when generating the abstract of the e-mail message 200 the given meaningless lexical unit is not included in this abstract. The method 500 then terminates.

In case at step 516 the result of the check is negative (step 520), i.e. when the check shows that the potential meaningless lexical unit is not the same as any of the meaningless lexical unit from the second lexical unit database 110, the method proceeds to step 524 where the potential meaningless lexical unit is defined as a meaningful lexical unit. Determining that the potential meaningful lexical unit as a meaningless lexical unit causes that fact that thereafter when generating the abstract of the e-mail message 200 the given meaningless lexical unit can be included in this abstract.

The method 500 then terminates.

As it was mentioned above, the method 500 of computer processing of an incoming e-mail message sent to the user which message includes a text is carried out to determine meaningless lexical units in the entire e-mail message or in a part of the e-mail message. In relation to the part of the e-mail message 200 which was checked for the presence of meaningless lexical units, an abstract can be generated, which abstract does not include meaningless lexical units. In other words, the abstract can include meaningful lexical units only.

In some implementations the method includes generating the abstract 410 of the e-mail message 200 and the abstract 410 of the e-mail message 200 is generated in such a way that there are no meaningless lexical units in the abstract 410 of the e-mail message 200.

In some implementations, the method includes generating the abstract 410 of a part of the e-mail message 200 and the abstract 410 of the part of the e-mail message 200 is generated in such a way that there are no meaningless lexical units in the abstract 410 of the part of the e-mail message 200. As a non-limiting example, the abstract of the e-mail message 200 can be an abstract of a predefined number of paragraphs in the beginning of an e-mail message.

In some implementations generating the abstract 410 of the part of the e-mail message 200 is generating an abstract of the most significant part of the e-mail message. As a non-limiting example, the most significant part of the e-mail message 200 is defined as the most significant logical block of the HTML code from the plurality of the logical blocks of the HTML code comprising text. Logical blocks of the HTML code can be defined by the e-mail message analysis module 106 of the mail server 102.

In some implementations, the most significant logical block of HTML code is a block of HTML code which comprises text the size of which is larger than the size of any other logical block of HTML code of the given e-mail message. A size of a text can be defined using a number of characters including or excluding punctuation marks and spaces.

In some implementations, the most significant logical block of HTML code is a block of HTML code which comprise text; the text of the most significant logical block of HTML code contributing the majority of meaningful lexical units in comparison with the text of any other logical block of HTML code of the given e-mail message. Meaningful lexical units can be defined by the e-mail message analysis module 106 of the mail server 102.

Figure 6:
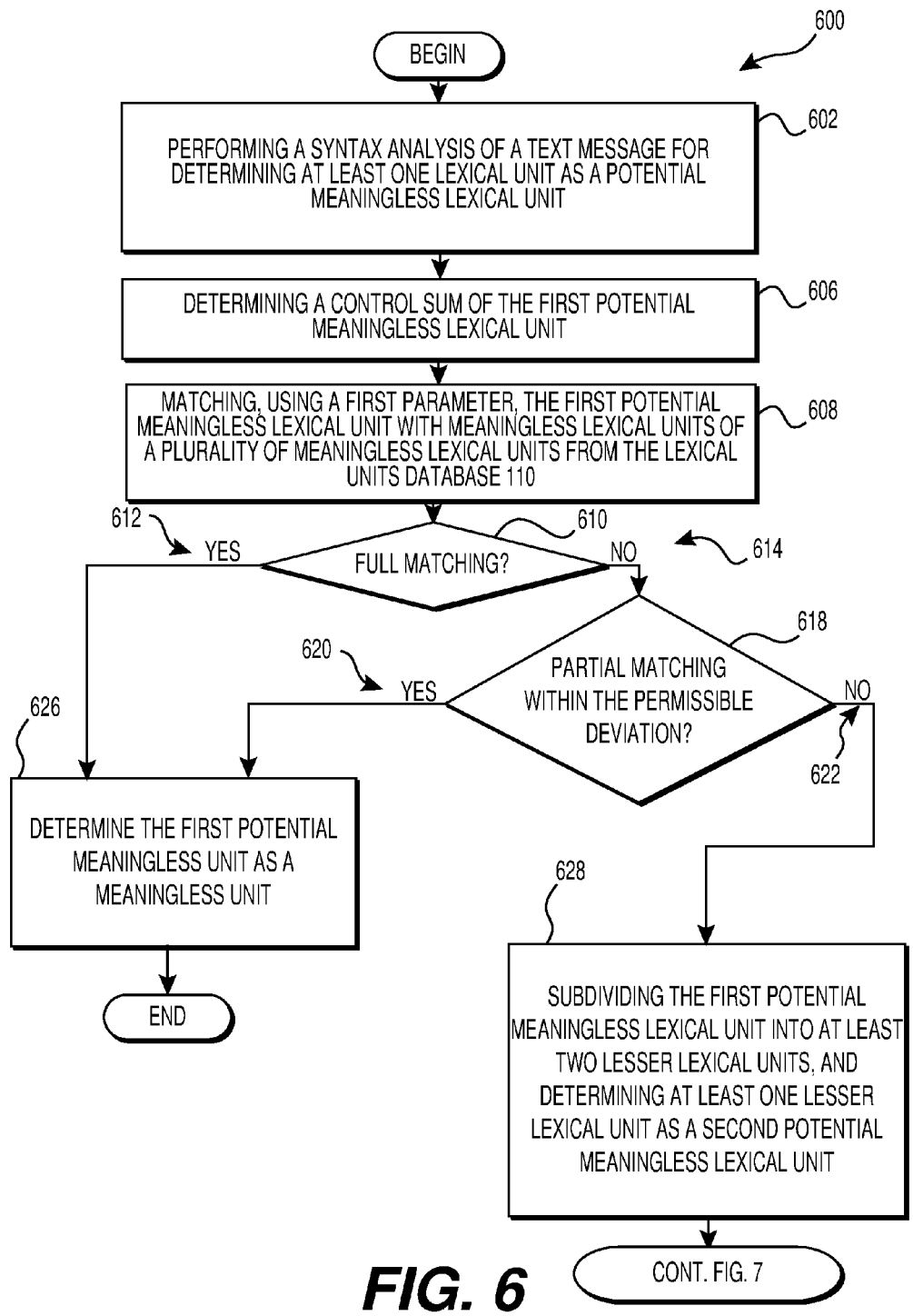
FIG. 6 and FIG. 7 are block-diagrams of a method 600 executed on the mail server 102 of FIG. 1, the method being implemented in accordance with non-limiting embodiments of the present technology.
Figure 7:
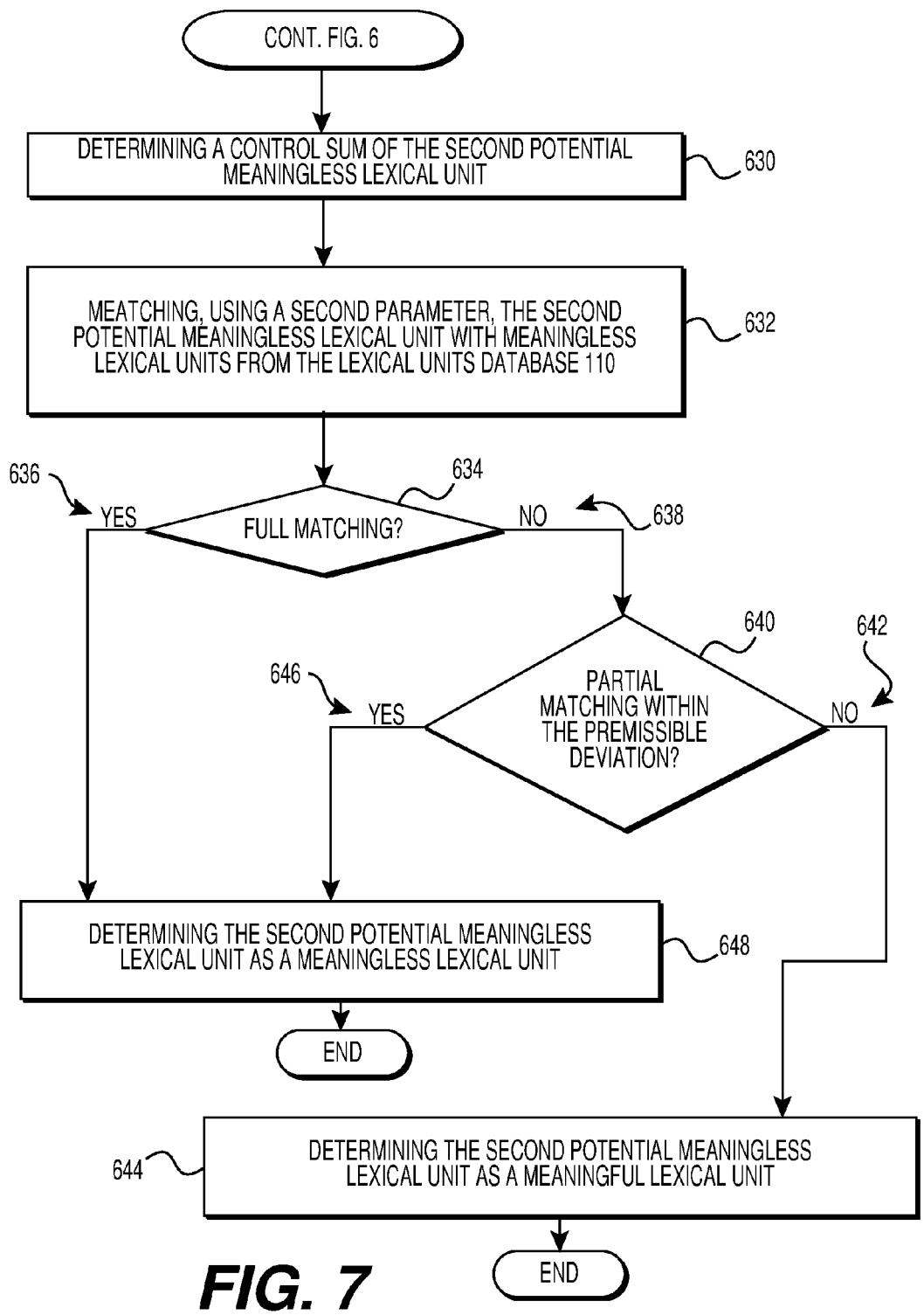

FIG. 6 and FIG. 7 are block-diagrams of a method 600 executed on the mail server 102 of FIG. 1 and implemented in accordance with non-limiting embodiments of the present technology. The method 600 is a computer implemented two-stage method of determining meaningless lexical units in a text message. In this implementation, the text message is the e-mail message 200.

The method 600 can be executed for performing a check using any lexical unit database. Thus, the check can be performed using the first lexical unit database 108 and/or the second lexical unit database 110 and/or the third lexical unit database (not depicted) which can be generated, and the like.

In implementations of the present technology the method 600 can be executed on the mail server 102 depicted in FIG. 1. For this purpose the mail server 102 includes the storage media 104 which stores computer-readable instructions, which when executed, are configured to cause the mail server 102 to execute the steps of the method 600. However, as those skilled in the art would understand, the method 600 can be executed on other servers.

In this implementation which is described in a block diagram of the method 600, the mail server 102 receives from a plurality of users of variety of e-mail services messages sent to different users, including the user 121.

Step 602—performing the syntax analysis of the e-mail message 200.

The method 600 begins at step 602, where the mail server 102 depicted in FIG. 1 performs the syntax analysis of the e-mail message 200. The message analysis module 106 performs the syntax analysis for determining meaningful and meaningless lexical units in the e-mail message 200.

In this implementation, performing the syntax analysis of the e-mail message 200 includes the markup language analysis of the e-mail message 200. Thus, in this implementation, the markup language analysis of the e-mail message 200 includes an analysis of HTML, tags of the e-mail message.

During performing of the analysis of HTML tags of the e-mail message the message analysis module 106 defines message blocks comprising text using tags which mark the beginning and the end of text blocks, paragraphs, table cells.

In alternative implementations, the markup language analysis of the e-mail message can include the analysis of a font type, a font size, a font face, punctuation marks and special marks.

During the analysis of punctuation marks and special marks some sentences can be detected as separate lexical units. Further, the sentence determination can be a basis for further analysis using the analysis of a font type, a font size, a font face. The indication of the end of a sentence can be both punctuation marks (for example, a dot, an exclamation mark, an ellipsis and the like) and special marks (for example, a paragraph mark, a tabulation mark, a page break mark and the like).

During the analysis of a font type, an analysis of different font types of different text parts is being performed. Such an analysis can be used for detecting lexical units. The fact that two text parts are written using different font can be a sign of the fact that these two text parts do not belong to the same lexical unit.

During the analysis of the font size and face type it can be detected that there are parts of sentences which are written using different font sizes and/or font faces (for example, in italic type and/or in bold type). Such an analysis can allow to identify marked parts of a sentence as lexical units.

In this implementation, the syntax analysis of the entire text of the e-mail message 200 is performed.

In alternative implementations, performing the syntax analysis of a text message can be performed using the entire text of the message or using a particular part of the message (for example, the first three paragraphs, or the first two paragraphs after a paragraph with a title or parts of the analysis can be chosen using any other parameter) or the most significant part of the text message.

In some implementations the method can further include receiving the incoming e-mail message 200.

Detecting at least one lexical unit as the first potential meaningless lexical unit.

Detecting at least one lexical unit as the first potential meaningless lexical unit can be a result of performing the syntax analysis of the e-mail message 200. Step 606 can be performed in the same way as step 502, the described above and it will not be described in details.

In this example at step 602 the message analysis module 106 selected as a first potential meaningless lexical unit a text fragment which fragment is an entire paragraph (not depicted) which includes two sentences (not depicted).

The method 600 then proceeds to step 606.

Step 606—determining a control sum of the first potential meaningless lexical unit.

At step 606 determining a control sum of the first potential meaningless lexical unit is performed. The control sum of the first potential meaningless lexical unit which lexical unit is intended to mean any quantitative characteristic which characterizes the lexical unit in an unbiased manner.

In the implementation the control sum of the first potential meaningless lexical unit is a combination of the following control elements: a number of words in the control unit, a number of letters in the control unit, a number of numbers in the lexical unit, a number of dots in the lexical unit, a number of commas in the lexical unit. The message analysis module 106 detected that the first potential meaningless lexical unit comprises 44 words, 268 letters, 9 numbers, two dots and two commas.

In alternative implementations, the control sum of the first potential meaningless lexical unit can be a combination of any of control elements including the following: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

For determining the control element of the first potential meaningless lexical unit, presented in the information handling and storage units, for example, in bytes, the message analysis module 106 performs an assessment of a corresponding non formatted text which is the lexical unit which is the first potential meaningless lexical unit. As those skilled in the art will understand, selection of a specific assessment method is not particularly important. In other words, it is possible to select different methods. In addition to the above once selected, the method has to be applied in succession for these control elements should be identical while calculating control elements of two or more identical lexical units presented in information handling and storage units.

The method 600 then proceeds to step 608.

Step 608—matching using the first parameter, the first potential meaningless lexical unit with lexical units from the lexical unit database.

At step 608 matching using the first parameter, the first potential meaningless lexical unit with lexical units from a plurality of lexical units from the lexical units database is performed, where matching using the first parameter is matching the control sum of the first potential meaningless lexical unit with control sums of meaningless lexical units from the second lexical units database 110.

In this implementation matching using the first parameter is matching using the first set of control elements, more specifically, the following five control elements from the database 110 in relation to every lexical unit: 1) a number of words in the control unit, 2) a number of letters in the control unit 3) a number of numbers in the lexical unit, 4) a number of dots in the lexical unit, 5) a number of commas in the lexical unit. In alternative non-limiting implementations matching control sums using the first parameter can be matching hash-code of the first potential meaningless lexical unit with hash-codes of meaningless lexical units from the second database 110.

At this step the message analysis module 106 checks the lexical unit database 110 for presence such lexical units which have the same control sums as the control sum of the first potential meaningless lexical unit.

In this implementation, the control sum of the first potential meaningless lexical unit corresponds to a control sum of a meaningless lexical unit from the lexical unit database if (a) these two control sums are identical, or (b) these two control sums are not identical but the difference is insignificant, i.e. the difference is within a predefined permissible amplitude of the difference.

At step 610 checking for equivalence of control sums is performed.

Two control sums are identical if all the control elements from the first set of control elements were identical. It means in this example that both the first potential meaningless lexical unit and the meaningless lexical unit from the database 110 have the following control elements: 44 words, 268 letters, 9 numbers, two dots and two commas.

If such an accurate match is detected (step 612) the method 600 then proceeds to execution of step 626 where the potential meaningless lexical unit is defined is a meaningless lexical unit.

If such an identical match is not detected (step 614) the method 600 then proceeds to execution of step 618 where a check for a measure of difference of control sums is performed. In this implementation the measure of the difference is determined for each control element from a control sum and the amplitude of the difference is defined for each control element from a control sum. In the given example the amplitude is defined as a maximum permissible measure of deviation which is presented as coefficients of permissible deviation which are used in relation to control elements from the lexical unit database 110. In the given example coefficients of a permissible deviation are defined as follows: 0.018 for words, 0.01 for letters, 0.5 for numbers; 0 for commas. After the application of the deviation coefficients all results are rounded up.

For example, in the lexical units database 110 there is a meaningless lexical unit with a control sum which includes the following control elements: 43 words, 265 letters, 9 numbers, two dots and one comma. When the coefficients are applied it becomes clear the control sum of the potential meaningless lexical unit is corresponding to the control sum of the meaningless lexical unit if every control element from the list below is within the following parameters:

the number of words—from 42 to 44 (a permissible deviation from 43 words is calculated as follows: 43×0.018=0.774, and 0.774 is rounded up to 1, i.e. the permissible deviation is +/−1);

the number of letters—from 262 to 268 (the permissible deviation is +/−3);

the number of dots—2 (the permissible deviation is +/−0);

the number of commas—2 (the permissible deviation is +/−0);

In this case, matching the measure of deviation at step 618 will show that the deviation is within the permissible deviation (step 620), control sums of the meaningless lexical unit and the first potential meaningless lexical unit will be considered corresponding, because the parameters of the first potential meaningless lexical unit will be within the amplitude of permissible deviation. In this case, the first potential meaningless lexical unit is defined as a meaningless lexical unit (step 626).

As it was mentioned before, after performing of any of steps 612 and 620 the potential meaningless lexical unit is defined as a meaningless lexical unit (step 626).

Considering the potential meaningless lexical unit as a meaningless lexical unit causes that fact that thereafter when generating the abstract of the e-mail message 200 the given meaningless lexical unit is not included in this abstract. The method 600 then terminates.

If in the previous example the deviation of at least one control element had exceeded the amplitude of permissible deviation, the control sums of the first potential meaningless lexical unit and the meaningless lexical unit from the database 110 would not have been considered as matching (step 622) and in this case the first potential meaningless lexical unit would not have been defined as a meaningless lexical unit. In this case the method 600 proceeds to step 628.

Step 628 subdividing the first potential meaningless lexical unit into at least two smaller lexical units and determining at least one smaller lexical unit as the second potential meaningless lexical unit.

At step 628 subdividing the first potential meaningless lexical unit into at least two smaller lexical units and determining at least one smaller lexical unit as the second potential meaningless lexical unit is performed.

Subdividing the first potential meaningless lexical unit to at least two smaller lexical units is performed by the message analysis module 106 by means of performing the syntax analysis of the first potential meaningless lexical unit as if the first potential meaningless lexical unit were an entire text message.

In this implementation, the first potential meaningless lexical unit (which in this example is a paragraph) is subdivided to some lesser meaningless lexical units which can be sentences.

In this example, the first potential meaningless lexical unit (which is a paragraph which includes two sentences) is subdivided into two smaller meaningless lexical units which are sentences from the same paragraph.

In alternative implementations, the first potential meaningless lexical unit is subdivided to two or more lesser meaningless lexical units and such lesser meaningless lexical units can be words, phrases, collocations, sentences, abbreviations, characters, dates, acronyms (including commonly-accepted ones), lexically meaningful combining forms of a compound words from a natural language and also their equivalent code notations and symbolic notations from an artificial language and the like.

The method 600 then proceeds to step 630.

Step 630—determining a control sum of the second potential meaningless lexical unit.

At step 630 determining a control sum of the second potential meaningless lexical unit is performed. The control sum of the second potential meaningless lexical unit which is a lexical unit is intended to mean any quantitative characteristic which characterizes the lexical unit in an unbiased manner.

In the implementation the control sum of the second potential meaningless lexical unit is a combination of the following control elements: a number of words in the control unit, a number of letters in the control unit, a number of numbers in the lexical unit, a number of dots in the lexical unit, a number of commas in the lexical unit. The message analysis module 106 detected that the second potential meaningless lexical unit comprises 19 words, 92 letters, 6 numbers, one dot and two commas.

In alternative implementations, the control sum of the second potential meaningless lexical unit can be a combination of any of control elements including the following: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

Step 632—performing a second check of at least one potential meaningless lexical unit by means of comparison with meaningless lexical units from the lexical unit database 110.

At step 632 the message analysis module 106 performs matching (using the second parameter) the second potential meaningless lexical unit with lexical units from the lexical units database 110, where matching using the second parameter is matching the control sum of the second potential meaningless lexical unit with control sums of meaningless lexical units from the lexical units database.

In this implementation matching using the second parameter is matching using the second set of control elements, more specifically, the following five control elements from the database 110 in relation to every lexical unit: 1) a number of words in the control unit, 2) a number of letters in the control unit 3) a number of numbers in the lexical unit, 4) a number of dots in the lexical unit, 5) a number of commas in the lexical unit. Thus, in this implementation the first set of control elements and the second set of control elements are the same. In alternative implementations the first set of control elements and the second set of control elements can be different. In alternative non-limiting implementations matching control sums using the first parameter can be matching hash-code of the first potential meaningless lexical unit with hash-codes of meaningless lexical units from the second database 110.

At this step the message analysis module 106 checks the lexical unit database 110 for presence of such lexical units which have the same control sums as the control sum of the second potential meaningless lexical unit.

In this implementation, the control sum of the second potential meaningless lexical unit matches the control sum of a meaningless lexical unit from the lexical unit database if (a) these two control sums are identical, or (b) these two control sums are not identical but the difference is insignificant, i.e. the difference is within a predefined permissible amplitude of the difference.

At step 634 checking for equivalence of control sums is performed.

Two control sums are considered identical if all the control elements from the first set of control elements were identical. It means in this example that both the second potential meaningless lexical unit and the meaningless lexical unit from the database 110 have the following control elements: 19 words, 92 letters, 6 numbers, one dot and two commas.

If such an accurate match is detected (step 632) the method 600 then proceeds to execution of step 648 where the potential meaningless lexical unit is defined is a meaningless lexical unit. The method 600 then terminates.

If such a match is not detected (step 638) the method 600 then proceeds to execution of step 640 where a check for a measure of difference of control sums is performed. In this implementation the measure of the difference is determined for each control element from a control sum and the amplitude of the difference is defined for each control element from a control sum. In the given example the amplitude is defined as a maximum permissible measure of deviation which is presented as coefficients of permissible deviation which are used in relation to control elements from the lexical unit database 110. In the given example coefficients of a permissible deviation are defined as follows: 0.018 for words, 0.01 for letters, 0.5 for numbers; 0 for commas. After the application of the deviation coefficients all results are rounded up. Accordingly, all the calculations are performed in the same way, as it was described above in relation to the check of the measure of deviation of the control sums of the first potential meaningless lexical unit and the meaningless lexical unit from the database 110.

In this case, matching the measure of deviation at step 638 will show that the deviation is within the permissible deviation (step 646), control sums of the meaningless lexical unit and the first potential meaningless lexical unit will be considered corresponding, because the parameters of the first potential meaningless lexical unit will be within the amplitude of permissible deviation. In this case, the second potential meaningless lexical unit is defined as a meaningless lexical unit (step 648).

If in the previous example the deviation of at least one control element had exceeded the amplitude of permissible deviation, the control sums of the second potential meaningless lexical unit and the meaningless lexical unit from the database 110 would not have been considered as corresponding (step 642) and in this case the second potential meaningless lexical unit would have been defined as a meaningful lexical unit (step 644).

The method 600 then terminates.

Considering the potential meaningless lexical unit as a meaningless lexical unit causes that fact that thereafter when generating the abstract of the e-mail message 200 the given meaningless lexical unit is not included in this abstract. The method 600 then terminates.

Considering the first potential meaningful lexical unit or the second potential meaningful lexical unit as a meaningless lexical unit causes that fact that thereafter when generating the abstract of the e-mail message 200 the corresponding meaningless lexical unit can be included in this abstract.

Within the present description it should be understood that in any case where retrieving data from any client device and/or from any mail server is mentioned, retrieving an electronic or other signal from corresponding client device (a server, a mail server) can be used, and displaying on a screen of the device can be implemented as transmitting a signal to the screen, the signal includes specific information which further can be interpreted with specific images and at least partially displayed on the screen of the client device. Sending and receiving the signal is not mentioned in some cases within the present description to simplify the description and as an aid to understanding. Signals can be transmitted using optical methods (for example, using fiber-optic communication), electronic methods (wired or wireless communication), mechanic methods (transmitting pressure, temperature and/or other physical parameters by means of which transmitting a signal is possible.

The invention claimed is:

1. A computer implemented method for detecting meaningless lexical units in an electronic message received by a server as to generate an abstract of the electronic message, the method comprising:
   (i) performing, by the server, a syntax analysis of a most significant part of the electronic message and determining at least one lexical unit as a first potential meaningless lexical unit, the first potential meaningless lexical unit comprising a plurality of control elements, the most significant part of the electronic message having been determined by analyzing a most significant logical block of source code from a plurality of the logical blocks of a source code of the electronic message;
   (ii) determining, by the server, a numerical control sum of the first potential meaningless lexical unit, the numerical control sum being based on the plurality of control elements having a respective numeric value representative of the first potential meaningless lexical unit;
   (iii) using the numerical control sum, accessing a lexical unit database located on the server, the lexical unit database containing a plurality of pre-determined meaningless lexical units with their associated pre-determined numerical control sums;
   (iv) determining, by the server, the first potential meaningless lexical unit is a meaningless lexical unit if the lexical units database includes at least one meaningless lexical unit with the pre-determined numerical control sum matching the numerical control sum of the first potential meaningless lexical unit, the matching comprising checking a measure of a difference between the numerical control sums and determining the numerical control sums as matching if the measure of the difference is within a predefined permissible amplitude of the difference;
   (v) if the first potential meaningless lexical unit is determined to be the meaningless lexical unit, generating, by the server, the abstract of the electronic message, the abstract not including the at least one meaningless lexical unit.

2. The method of claim 1, if there is no meaningless lexical unit with a predetermined numerical control sum matching the numerical control sum of the first potential meaningless lexical unit in the lexical unit database, the method further comprises:
   (i) subdividing the first potential meaningless lexical unit into at least two smaller lexical units and determining at least one smaller lexical unit as the second potential meaningless lexical unit;
   (ii) determining, by the server, a numerical control sum of the second potential meaningless lexical unit;
   (iii) matching using a second parameter the first potential meaningless lexical unit with lexical units from the lexical units database, wherein matching using the second parameter comprises matching the numerical control sum of the second potential meaningless lexical unit with predetermined numerical control sums of meaningless lexical units from the lexical units database;

(iv) determining, by the server, the second potential meaningless lexical unit is a meaningless lexical unit if the lexical units database includes at least one meaningless lexical unit with a predetermined numerical control sum matching the numerical control sum of the second potential meaningless lexical unit;

(v) if the second potential meaningless lexical unit is determined to be the meaningless lexical unit, generating, by the server, the abstract of the electronic message, the abstract not including the at least one meaningless lexical unit.

3. The method of claim 2, wherein the first potential meaningless lexical unit is a paragraph and the second potential meaningless lexical unit is a sentence from the paragraph.

4. The method of claim 1, wherein the plurality of control elements comprises at least one of: a number of characters in a lexical unit, a number of letters in the lexical unit, a number of capital letters in the lexical unit, a number of lower-case letters in the lexical unit, a number of spaces in the lexical unit, a number of numbers in the lexical unit, a number of special marks, a number of words in the lexical unit, a size of the lexical unit expressed in information handling and storage units.

5. The method of claim 4, wherein the matching using the first parameter is carried out using a first set of control elements and matching using the second parameter is carried out using a second set of control elements.

6. The method of claim 5, wherein the first set of control elements and the second set of control elements are the same.

7. The method of claim 1, wherein a lexical database includes at least one meaningless lexical unit with a numerical control sum corresponding to the numerical control sum of the potential meaningless lexical unit, the method further comprises performing a character-by-character match of the potential meaningless lexical unit with the at least one meaningless lexical unit and wherein in response to a match of a character sequence of the potential meaningless lexical unit with a character sequence of the at least one meaningless lexical unit, the method further comprises determining the potential meaningless lexical unit as a meaningless lexical unit.

8. The method of claim 1, wherein a lexical unit from the plurality of lexical units from the lexical unit database is meaningless if its weight exceeds the predefined threshold value.

9. The method of claim 8, wherein the lexical unit database is generated on the basis of the plurality of lexical units which can be found in the plurality of text messages and in which a weight of each lexical unit is in direct proportion with the given lexical unit frequency in the plurality of lexical units which can be found in the plurality of the text messages.

10. The method of claim 1, wherein analyzing the markup language source code of the electronic message comprises analyzing at least one of: a structure of a electronic message, a font type, a font size, a font face, punctuation marks, and special marks.

11. The method of claim 1, wherein carrying out the syntax analysis of the electronic message comprises executing a syntax analysis of a predefined number of paragraphs from the beginning of the electronic message.

12. The method of claim 1, wherein the electronic message is an e-mail message.

13. The method of claim 1, wherein the most significant logical block of the source code comprises a block of the source code which comprises text, and the size of which is larger than a size of any other logical block of the source code of the e-mail message.

14. The method of claim 1, wherein the most significant logical block of the source code is a block of the source code which comprises text, and wherein the text of the most significant logical block of the source code comprises the majority of meaningful lexical units in comparison with the text of any other logical block of the source code of the given e-mail message.

15. The method of claim 1, wherein the lexical unit is any of:
   a word,
   a phrase,
   a sentence,
   a paragraph.

16. The method of claim 1, wherein determining at least one lexical unit as a potential meaningless lexical unit comprises determining at least one meaningful lexical unit.

17. The method of claim 1, wherein determining at least one lexical unit as a potential meaningless lexical unit is performed on the basis of the syntax analysis of one of:
   an entire text of the electronic message, and
   a part of the text of the electronic message.

18. The method of claim 1, wherein an unique control sum is an ID of a unique lexical unit.

19. A computer including a processor, the processor being configured to render the computer operable to execute:
   (i) performing a syntax analysis of a most significant part of an electronic message and determining at least one lexical unit as a first potential meaningless lexical unit, the first potential meaningless lexical unit comprising a plurality of control elements, the most significant part of the electronic message having been determined by analyzing a most significant logical block of source code from a plurality of the logical blocks of a source code of the electronic message;
   (ii) determining a numerical control sum of the first potential meaningless lexical unit, the control sum being based on the plurality of control elements having a respective numeric value representative of the first potential meaningless lexical unit;
   (iii) using the numerical control sum, accessing a lexical unit database located on the server, the lexical unit database containing a plurality of pre-determined meaningless lexical units with their associated pre-determined numerical control sums;
   (iv) determining the first potential meaningless lexical unit is a meaningless lexical unit if the lexical units database includes at least one meaningless lexical unit with the pre-determined numerical control sum matching the numerical control sum of the first potential meaningless lexical unit, the matching comprising checking a measure of a difference between the numerical control sums and determining the numerical control sums as matching if the measure of the difference is within a predefined permissible amplitude of the difference;
   (v) if the first potential meaningless lexical unit is determined to be the meaningless lexical unit, generating, by the server, the abstract of the electronic message, the abstract not including the at least one meaningless lexical unit.

20. The computer of claim 19, if there is no meaningless lexical unit with a predetermined numerical control sum corresponding to the numerical control sum of the first potential meaningless lexical unit in the lexical unit database, the processor being further configured to render the computer operable to execute:
  (i) subdividing the first potential meaningless lexical unit into at least two smaller lexical units and determining at least one smaller lexical unit as the second potential meaningless lexical unit;
  (ii) determining a numerical control sum of the second potential meaningless lexical unit;
  (iii) matching using a second parameter the first potential meaningless lexical unit with lexical units from the lexical units database, wherein matching using the second parameter comprises matching the numerical control sum of the second potential meaningless lexical unit with predetermined numerical control sums of meaningless lexical units from the lexical units database;
  (iv) determining the second potential meaningless lexical unit is a meaningless lexical unit if the lexical units database includes at least one meaningless lexical unit with a predetermined numerical control sum matching the numerical control sum of the second potential meaningless lexical unit;
  (v) if the second potential meaningless lexical unit is determined to be the meaningless lexical unit, generating, by the server, the abstract of the electronic message, the abstract not including the at least one meaningless lexical unit.

* * * * *

UNITED STATES PATENT AND TRADEMARK OFFICE
CERTIFICATE OF CORRECTION

| | |
|---|---|
| PATENT NO. | : 9,971,762 B2 |
| APPLICATION NO. | : 15/525800 |
| DATED | : May 15, 2018 |
| INVENTOR(S) | : Egor Vladimirovitch Ganin et al. |

It is certified that error appears in the above-identified patent and that said Letters Patent is hereby corrected as shown below:

In the Claims

Claim 1, Column 34, Lines 26-28, "(i) a plurality of the logical blocks of a source code of the electronic message;" should read --(i) a plurality of the logical blocks of the source code of the electronic message;--

Claim 8, Column 35, Lines 52-53, "the predefined threshold value" should read --a predefined threshold value--

Claim 9, Column 35, Line 55, "is generated on the basis of" should read --is generated based on--

Claim 9, Column 35, Line 56, "text messages" should read --electronic messages--

Claim 9, Column 35, Line 60, "text messages" should read --electronic messages--

Claim 10, Column 35, Lines 61-62, "wherein analyzing the markup language source code of the electronic message" should read --wherein analyzing the source code of the electronic message--

Claim 10, Column 35, Line 63, "a structure of a electronic message" should read --a structure of the electronic message--

Claim 13, Column 36, Lines 8-9, "the source code of the e-mail message" should read --the source code of the electronic message--

Claim 14, Column 36, Lines 13-16, "the source code comprises the majority of meaningful lexical units in comparison with the text of any other logical block of the source code of the given e-mail message" should read --the source code comprises a majority of meaningful lexical units in comparison with a text of any other logical block of the source code of the given electronic message--

Signed and Sealed this
Eleventh Day of December, 2018

Andrei Iancu
*Director of the United States Patent and Trademark Office*